United States Patent [19]

Youngstrom et al.

[11] 3,740,463

[45] June 19, 1973

[54] IMPROVED EDITING SYSTEM

[75] Inventors: Jerry R. Youngstrom, Sunnyvale; Wilfred K. Anderson, San Jose; Martin Wallace Fletcher, Palo Alto; Caljon H. Strobele, Los Altos Hills; Kenneth T. Taylor, Menlo Park, all of Calif.

[73] Assignee: Memorex Corporation, Santa Clara, Calif.

[22] Filed: Feb. 16, 1971

[21] Appl. No.: 115,673

[52] U.S. Cl. .. 178/6.6 A, 178/6.6 DD, 178/6.6 SF, 178/5.6

[51] Int. Cl. .......... H04n 5/76

[58] Field of Search .......... 178/5.6, 6.65 F, 178/6.65 DD, 6.65 A

[56] References Cited

UNITED STATES PATENTS

| | | | |
|---|---|---|---|
| 3,446,914 | 5/1969 | Hodge | 178/5.6 |
| 3,493,674 | 2/1970 | Houghton | 178/5.6 |
| 3,466,387 | 9/1969 | Rout | 178/5.6 |
| 3,504,115 | 3/1970 | Suzuki et al. | 178/5.6 |

*Primary Examiner*—James W. Moffitt
*Attorney*—Limbach, Limbach & Sutton

[57] ABSTRACT

A system for recording and randomly selecting and reproducing audio-video information signals is provided with means for encoding audio and frame code information signals within video information signals.

11 Claims, 43 Drawing Figures

SKIPFIELD CONTROL 49

MODULATOR 42

IMPROVED EDITING SYSTEM

BACKGROUND OF THE INVENTION

This invention relates to television editing and assembly systems and, more particularly, to an improved apparatus and method for automatically editing television information, for enabling immediate review of the results of the editing decisions, and for assembling the edited information on an ultimate storage medium.

In the field of television broadcasting, video tape has generally become recognized as a most advantageous medium on which to store television broadcast programs and, for some years, the use of magnetic tape as a major production medium has been an attractive goal to broadcasters, producers, and production houses. Video tape has a number of advantages for production usage, including good technical quality, simplicity of handling, and, if used properly, low cost. It has the further advantages of instant replay of recorded material, good color fidelity, low noise levels, and compatibility with the electronics television medium. In spite of these advantages, however, magnetic tape has not supplanted film as a production medium because, for example, of the difficulty in editing the recorded information. The motion picture film editor is able to examine the film on a frame-by-frame basis, with completely compatible readout, at zero speed. Obviously, the editor cannot see the information recorded on magnetic tape without a reproducing device, and then it is only when the relative velocity between tape and reproducing head is very close to the nominal value that the picture becomes usable.

It is evident, then, that video-tape editing is a dynamic operation rather than a static one, and for this reason improved tape editing becomes necessary if the industry is to benefit from the use of tape, as a low-cost hi-fidelity production medium.

For a number of years, manual editing of television tape has been used, involving either physical splicing (cutting) or electronic splicing (re-recording) techniques. Both methods are slow, costly and awkward for major production usage. Also, these methods essentially make it difficult and costly for the editor to modify an editing decision, once made.

The foregoing difficulty of editing has led to the development of automatic video tape editing and splicing systems, a representative one of which, hereinafter referred to as the NHK system, is described in Volume 76, No. 3, pp. 169–176 of the March, 1967 edition of the Journal of the Society of Motion Picture and Television Engineers and is entitled "An Automatic Video Tape Editing Splicing System Using a Process Computer." As described in this article the output signals of studio cameras are recorded on an original tape which provides the address signals consisting of coded time signals for minutes, seconds and frames over the entire length of the tape. A second video tape is recorded, either at the same time as, or from the original tape, on a helical scan video tape recorder, with exactly the same address signals, which serve as location cues. Only the helical scan tape is used for editing, which is accomplished by pushing "cut-in" and "cut-out" buttons at the appropriate scenes, in normal, still or slow-motion viewing on a single monitor. With these push buttom operations, the editor's decisions are transferred to the drum memory of a computer.

The original tape and a master tape are later run in parallel on two separate video recorders. The record of the original, at the appropriate places and sequence recorded in the computer, is dubbed automatically onto the master. The NHK system provides many advantages over previous editing systems, which advantageous features are summarized in the above-referenced article. However, in this system editing decisions are made largely "on the fly," both at "exit" from one sequence to "entry" of the next sequence, without opportunity for him to compare the "exit" and "entry" scene as they will appear in the ultimate master, and, as acknowledged in the article, with the NHK system the editor cannot see the results of his editing decisions immediately after completion of the editing (as in the case of film for example) but must play through the entire assembled master to observe them. If upon viewing, the editor wishes to alter one or more "cuts," it is necessary to erase the information recorded on the master and repeat the above-outlined process.

In a more recent development an automatic editor-controllable system for selecting excerpts from a source of electronic picture information and forming a program representative of a sequence of the excerpts was developed by CBS Broadcasting Co. In that system means are provided for storing the picture information signals in a predetermined order, each frame of the picture information having an address associated therewith. Reading means are provided for simultaneously reading out picture information signals from two editor-selected regions of the stored picture information. First and second display means coupled to the reading means are adapted to simultaneously display to the editor the outputs of the reading means. Switching means couple the first and second reading means to the first and second display means. Means are provided for sensing and storing the addresses within the two regions corresponding to an editor-selected transition point as between the two regions.

The addresses corresponding to editor-selected transition points are stored in program-operable computing means, the computing means generating digital signals which are a function of the addresses. Control circuit means responsive to the digital signals are provided for actuating the first and second reading means to read out in real time the sequence of excerpts constituting the formed program. This real time readout or "rehearse" is accomplished by viewing the already stored picture information, actual splicing or re-recording not being required.

As was indicated, in the CBS system, during the editing operation picture information from two editor-selected regions are simultaneously displayed to the editor on first and second display means. These display means preferably comprise a pair of side-by-side monitors. This system has the capability of still-framing the picture information on the two monitors. By still-framing within his selected regions, the editor can carefully examine the "exit" and "entry" frames of a proposed transition point for artistic quality and effect before making his editing decisions.

The stored addresses corresponding to editor-selected transition points constitute a "program" of excerpts which can later be utilized to form a final assembled program on an ultimate storage medium. Before finalization, however, the editor can freely amend his previous editing decisions by issuing appropriate commands to the computer to add or remove "cuts" from the stored list of editing decisions. Thus it is seen that with the present invention the editor has the combined advantages of immediate review of his editing decisions without loss of flexibility as to amending those decisions.

The CBS system, however, allows only for total-frame recordings and play back and therefore suffers from storage capacity problems.

SUMMARY OF THE INVENTION

It is therefore an object of the invention to provide improved apparatus for storing audio-video information signals.

Another object of the invention is to provide apparatus for storing audio-video informations together and in a manner in which the stored information can then be reproduced by randomly addressing the desired audio-video segment.

Another object of the invention is to provide an improved automatic video tape editing system in which audio encoded video information can be retrieved by addressing the desired segment of audio encoded video information.

In accordance with the invention apparatus for recording and reproducing audio-video information signals which includes means for encoding audio information signals within, and in synchronization with, the corresponding video information signals to form a composite audio-video information signal. This composite signal is then stored in suitable magnetic storage media, such as a plurality of magnetic disc recorders.

To retrieve and reproduce the stored composite signals, means are provided for randomly addressing desired segments of the composite audio-video signals and then synchronously reproducing the audio and the video portions of the composite signals.

In the preferred embodiment the audio information is encoded and stored within the horizontal sync intervals of the video fields. Also, the preferred embodiment the addressing means comprises the use of a unique code signal for each recorded video frame or field. Such a code is also stored within the video preferably during the vertical intervals.

DESCRIPTION OF THE PREFERRED EMBODIMENTS

Figures 1, 8A, 8B:
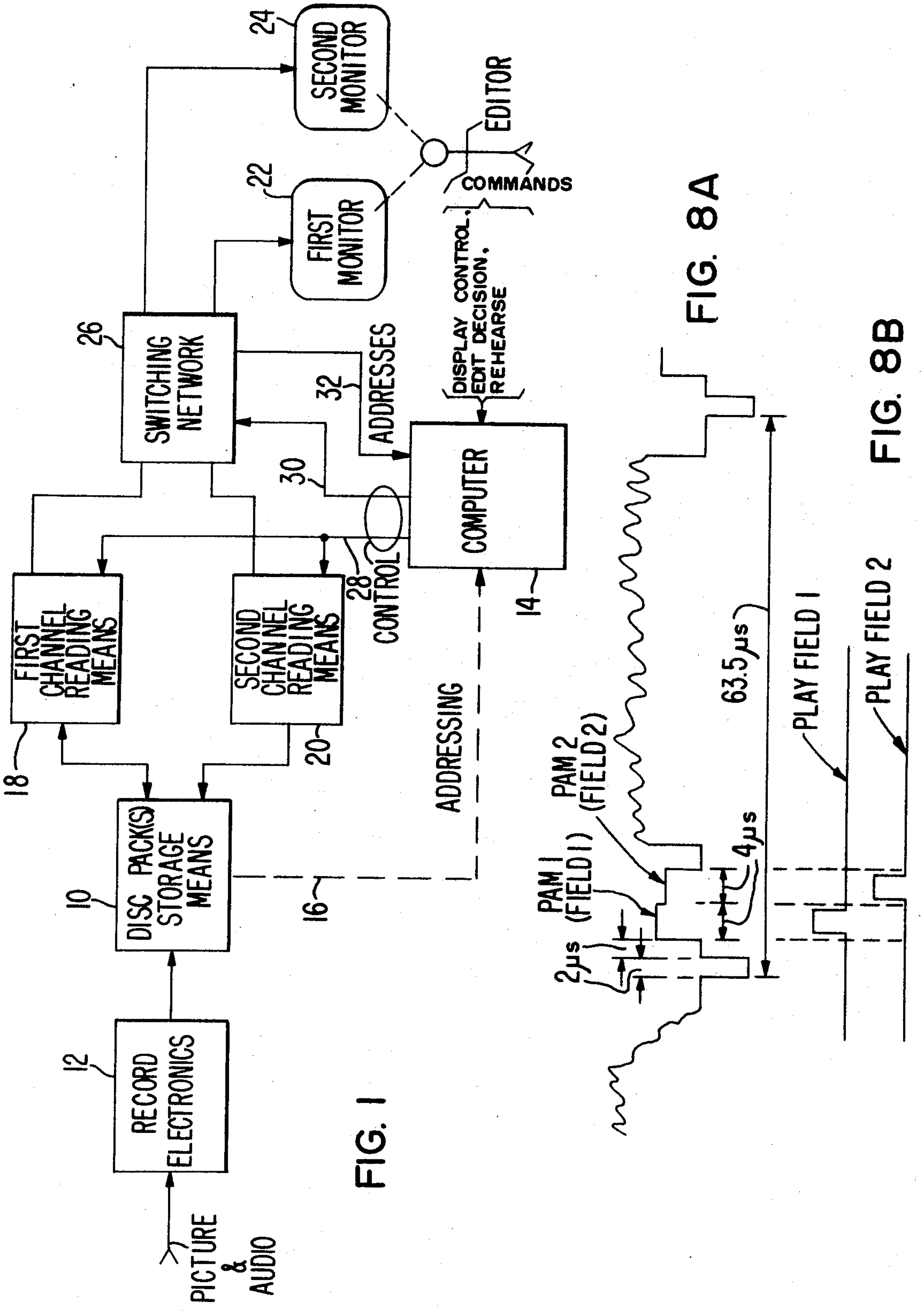
FIG. 1 is a generalized block diagram of an improved editing system.
FIGS. 8A and 8B illustrate audio PAM samples utilized in the present invention.

Referring to FIG. 1, there is shown a simplified block diagram which illustrates the basic editing functions of the present invention. An editing system performing many of the same functions of the present editing system is disclosed in a copending patent application, Ser. No. 113,429 filed Feb. 8, 1971, entitled "Method and Apparatus for Automatically Editing Television Information" by Adrian B. Ettlinger. Electronic picture input information (and associated audio) is stored in a manner which will be discussed in detail subsequently, in selected order, in a rapid-access disc pack storage device 10 after passing through various record electronics 12. The input picture information consists of a series of video frames, each frame comprising a pair of fields as is conventional in the television industry. In accordance with the invention at least a portion of the video information signals, such as every other field is stored with disc pack(s) 10. In the present embodiment, each frame has a unique address associated with it comprising a digital notation which is externally generated and stored within the video frame. In addition to the stored addresses, in accordance with the present invention, the audio signals are additionally stored within the video information signals.

A computer 14 "knows" the address of each frame stored within the disc packs 10 as is indicated by the dashed coupling 16. A first channel reading means 18 and a second channel reading means 20 are each coupled to the disk pack(s) 10. The reading means 18 and 20 are each operable to read out selected regions of picture information from the disc pack(s) 10 for display on a first monitor 22 and a second monitor 24. The audio associated with each picture frame is likewise presented to the editor along with the video information in two formats, either of which is available. The standard is provided audibly and an optional way is to visually display the audio on the TV monitor.

The monitors 22 and 24 are each switchably coupled to both of the reading means by a switching network 26. The monitors are positioned in close proximity for convenient simultaneous viewing by the editor. Specific regions of picture information to be read out by the reading means 18 and 20 are chosen by the editor.

The editor issues appropriate "control" commands to the computer 14 which, in turn, generates control signals on 28 that direct the storage means 10 and the reading means 18 and 20 to certain addresses within the storage means 10. The computer further generates control signals on 30 which actuate the switching network to display the regions of picture information on the specific monitors chosen by the editor. During the reading and display of picture information address signals 32, which may be switched through the network 26, allow the computer 14 to monitor, on a frame-by-frame basis, the address locations of the reading means 18 and 20.

When the editor decides that an edit point should occur at a certain transition as between the two regions of picture information being read out, he issues an "edit" command to the computer 210. The computer senses and stores the address or addresses corresponding to the edit print. When the editor wishes to review the picture information program comprising a compilation of his previous editing decisions, he issues a command to rehearse to the computer 14.

The computer effectively sorts the previously stored edit point addresses and generates control signals on 28 that direct the reading means 18 and 20 to sequentially read out for display the editor-selected excerpts of picture information. During the rehearse, the editor can, if he wishes, make new editing decisions which alter his previously compiled program. The final stored list of edit point addresses are later used to form a final program on a separate master storage medium.

Figure 2A:
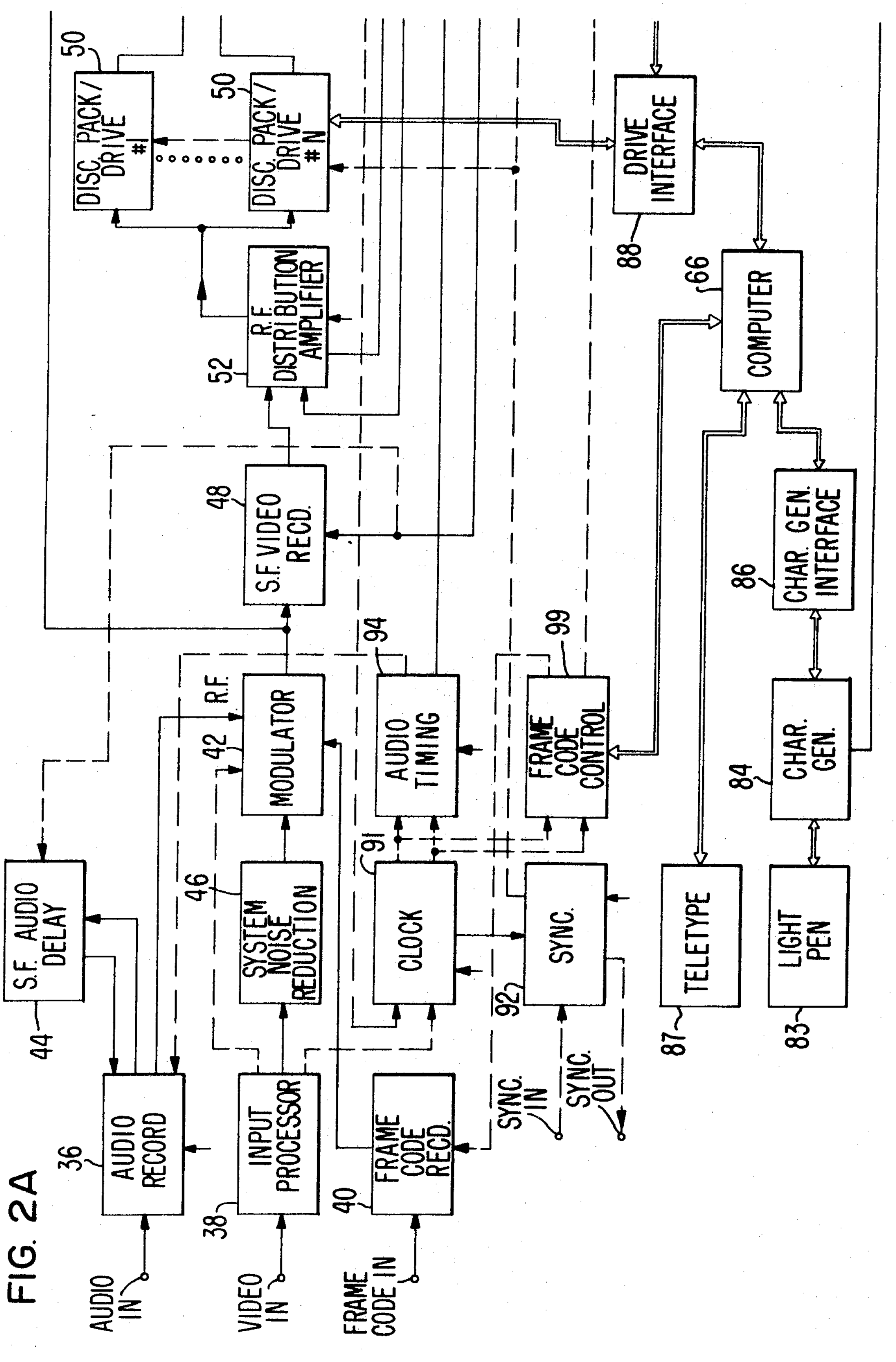
FIG. 2A and 2B is a block diagram of an improved editing system in accordance with the present invention.
Figure 2B:
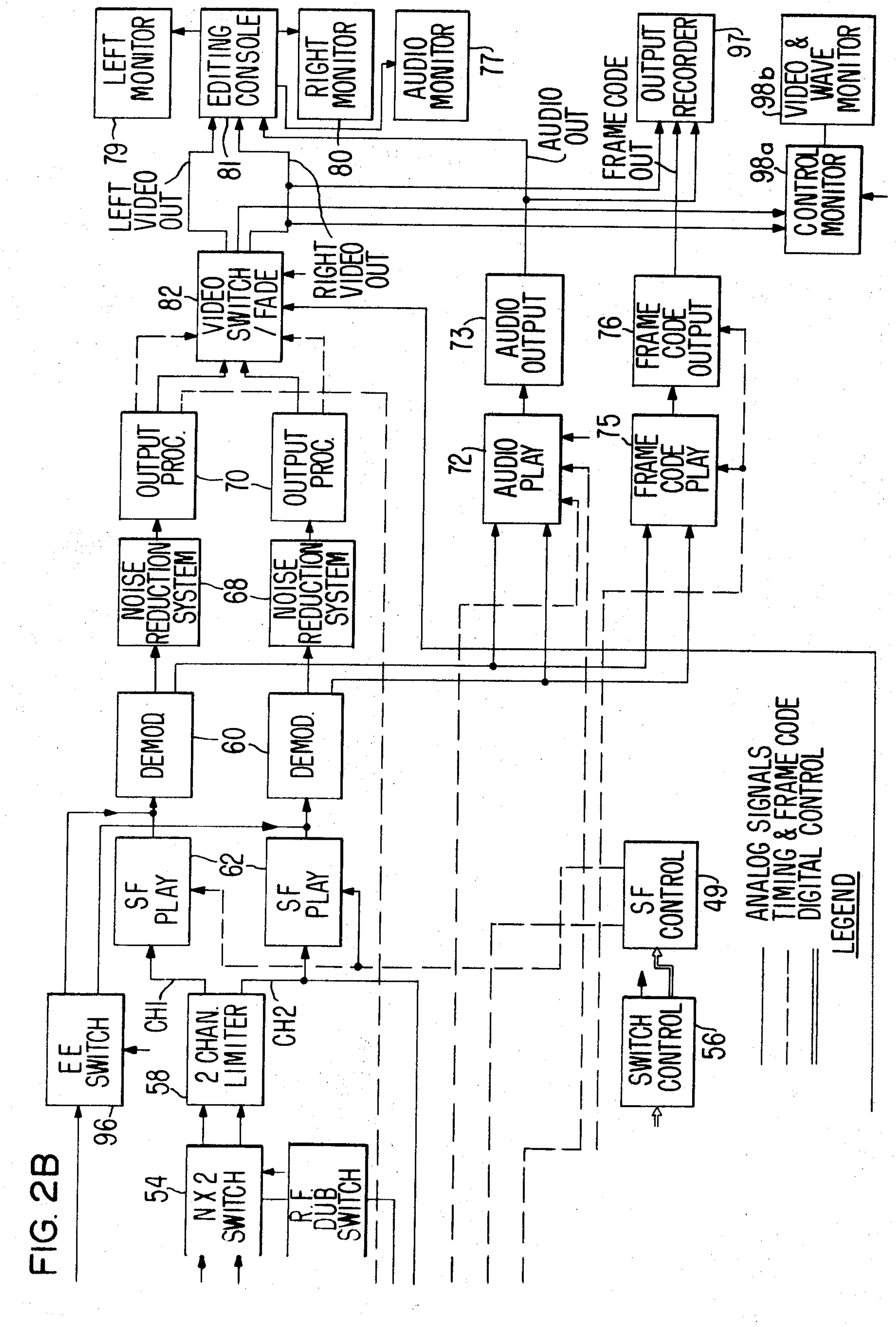

Referring to FIG. 2 there is shown a more detailed block diagram of the improved editing system 34 of the present invention. Audio, video, and frame code information signals are inputed into the editing system 34 respectively through an audio record circuit 36, an input processor circuit 38, and a frame code record circuit 40.

The incoming video signals originate, for example, from a conventional (color) television camera (not shown) which develops conventional (color) television signals representative of the information in the scene or object field scanned by the camera. As another example, the video signals could originate from a film source projected into a TV camera. Television signals developed by the camera are supplied, for example, to a (color) video tape recorder (not shown) which may be, for example, of the Ampex quadruplex VR 2000 type.

At the same time or at a subsequent time the color television signals are stored on the tapes of the video recorders, a time code generator (not shown) supplies at least address signals consisting of coded time signals for hours, minutes, seconds and frames of the television signals. The time code generator may be of the type made by the Electronic Engineering Company of Santa Ana, California (EECO). This type generator utilizes a binary code to supply groups of pulses representative of time in hours, minutes and seconds and, if desired, user information, shown in FIG. 17.

Desirably, the code utilized conforms so that generally in use in the industry. For an example, of an editing code system proposed jointly by American Broadcasting Company, Columbia Broadcasting System, and National Broadcasting Company, reference is made to a paper entitled "Ad Hoc Committee on Video Tape Time Code, Two-Inch Quadruplex Video Magnetic Tape Recording Proposed Requirements" published Mar. 31, 1970.

Video input signals are processed by the Input Processor 38. This circuit takes the normal timing signals present in video broadcast signals, i.e., vertical and horizontal sync signals, reprocesses them, to remove their noise content and to reposition them. In particular, the horizontal sync pulses are narrowed and occur sooner than the "normal" sync pulses.

The purpose of this is to lengthen the "backporch" of the horizontal interval. The "backporch" is a term of art referring to the signal time between the horizontal sync pulse and the next video signal. This is the area of the signal in which the audio signals are stored and for this reason it is desirable to increase the size of the "backporch." Since the color burst is normally located on the backporch, another function of the input processor is to eliminate the color burst.

The input processor 38 also processes the stripped sync pulses for use by other parts of the system for timing and processing purposes. Also the vertical interval is processed so that the frame code information can be added at the modulator 42 during the vertical interval.

The audio processing circuits include the audio record circuit 36 and skipfield audio delay circuit 44. The audio record circuit 36 performs one main function: to convert the incoming audio signals into a form suitable for storage within the video format. In particular, in the preferred embodiment, the audio is stored within the backporch of the horizontal interval 50, the form of the audio must be such that it can be stored within this region.

One approach which is being utilized is called pulse amplitude modulation (PAM). With PAM, samples of audio information are taken and a pulse, corresponding in amplitude to the sample, is recorded in the backporch of the horizontal interval. Thus in the present system, for example, for each scan line lasting 63.5 microseconds, a 4 microsecond PAM audio pulse is recorded in the backporch.

The purpose of the skipfield audio delay circuit 44 will be explained in connection with the skipfield mode of operation of the present invention. In general, however, during skipfield operation two audio PAM samples, each of 4 microsecond duration are stored consecutively on the backporch of the horizontal interval.

The output of the input processor, if desired, can be sent through a noise reduction circuit 46 before being sent to the modulator 42. This circuit reduces much of the noise created by the disc drives and their associated equipment.

The modulator 42 performs two main functions. First it sums the audio PAM pulses and the frame code address signals within the video format, and secondly it converts the broadband video signals into a form more adaptable for recording on disc recording media. The modulator 42 converts the normal video signals, which have a frequency range of approximately D.C. to 2 MHz to RF signals. In particular, in one embodiment, the modulator converts the video signals into RF coded, pulse interval modulated (PIM) signals having a 2.1 MHz to 3.5 MHz deviation. Of course other forms of modulation besides PIM could be utilized, PIM being only a preferred means.

The PIM, RF signals, now encoded with audio and frame code information next are sent to the skipfield video record circuit 48. With skipfield operation, only every other field of information is recorded, i.e., every other field is "skipped." This approach has three main advantages in an editing system utilizing magnetic disc type storage media. First, it allows twice as much "copy" to be recorded for the same amount of storage capacity. Secondly, because of the time intervals inherent between skipped fields, only single disc packs are required. Third, it eliminates still frame flicker due to the differential motion present in the two fields of the same frame.

In contrast, prior art systems, such as that disclosed in the above cited patent application, require the use of pairs of disc packs. This is because where continuous, non-skipfield recording is made, in order to maintain continuity it was necessary to have an extra disc pack in order to allow the other pack's recording heads to move to the next play/record position. In other words, while one pack is in the record mode, the heads of the other move to the next position. Since there is a field interval between each field which is recorded in the skipfield mode the need for a second pack is eliminated, there being sufficient time between fields to allow for movement of the record heads.

As will be explained in more detail later, the ultimate visual quality of a reproduced skipfield recording at the editor's monitors is sufficiently high that editing functioning is possible. However, while it is satisfactory to eliminate one-out-of-two or more fields of video, the same is not true for audio. In fact, it has been found that for satisfactory audio reproduction, the audio samples associated with each field of video must be retained and ultimately reproduced.

Consequently, at the modulator 42 audio information for both fields of each frame is encoded into the video horizontal interval, although only every other field of video picture information is retained during skipfield operation. To accomplish this, as will be explained in more detail subsequently, two audio PAM pulses are encoded in the horizontal interval for each field of video which is retained and stored in skipfield operation. Only one PAM pulse is recorded for non-skipfield operation.

The skipfield video record circuit 48 includes a skipfield magnetic recording disc which is rotated synchronously with the N-disc pack drives 50. The skipfield recording disc plays an important part in permitting skipfield data to be recorded within the disc packs 50 and will be discussed in detail subsequently. Operation of the skipfield record system 48 requires numerous switching functions. Skipfield control assembly 49, under computer control, provides detailed command pulses to the skipfield play system 48.

From the skipfield video record 48 the encoded RF video signals are distributed to the various disc pack recorders 50 by means of an RF distribution amplifier 52. Such amplifiers are presently commercially available. One such amplifier which is adaptable for the present system is Grass Valley Model No. 902. The disc pack storage devices may be of the type similar to that manufactured by Memorex Corporation and designated as the "Mark VI" disc pack. Each disc pack consists of 11 aluminum discs coated with a magnetic oxide and mounted about a half-inch apart on a common hub. Standard or highly coercivity coatings, such as $CR\ O_2$, can be used. Information is recorded on the 20 inner disc surfaces by magnetizing the magnetic oxide particles. Recordings are made on 203 concentric circles or "tracks" on each disc surface. Since corresponding tracks on all 20 surfaces are vertically aligned, they are considered "information cylinders"; there being 200 such cylinders per disc pack.

The disc pack 50 is adapted for installation on the spindle of a disc driver (not shown) which rotates it at a speed synchronous with the video, typically at 1,800 rpm for a 525 line, 60 Hz system. A suitable model is a modified version of Memorex Corporation's Model 660-1 Series Disc drive. There are 20 movable read/write heads in each unit (one for each disc surface). The heads move on a single carriage so that all 20 heads are positioned to the same cylinder simultaneously. However, only one head is selected to read or write at a time. The heads can move relatively quickly between remote cylinders, having an average access time of 50 milliseconds. The maximum possible access time as between cylinders is 80 milliseconds.

Also housed in the blocks 50 are the servo systems which keep all the discs in sync and the record and reproduce electronics, which, in this case are RF drivers connected to the recording head for recording, RF preamplifier for playback and the frequency and phase equalizers. For optimum performance, it is necessary to modify the standard disc drives and also the read/write heads and associated circuitry therefore for the present application. The requirements for the editing system of the present invention are different than for use in the usual digital applications.

For example, the flying read/record heads can be lowered from approximately 100 microinches to 50-60 microinches. The heads must be kept this close to the disc surface in order to transmit the entire bandwidth of the PIM video signals. As already mentioned, the speed of rotation of the discs is approximately 1,800 rpm (as compared with 2,400 rpm for digital applications). Additionally, various safety circuit modifications should be made.

In normal digital applications using standard disc packs, when more than one disc pack is utilized, no attempt is made to maintain synchronization among the disc packs. Rather, each disc pack is operated independently of the others. Each disc is provided with an index point. To determine the location of a point where data is to be recorded or played, a clock is provided which is synchronized with the index point.

Thus if it is desired to record, for example, a data sequence at a particular point on a particular disc, the disc continues to rotate until the disc pack recorder is rotated around to its index timing point and has rotated the desired number of clock units. It then feeds back the information that it is in the proper mode for selection. Once selected, the data is read into the disc pack.

Rather than this type of a system which is essentially asynchronous and random in pattern of actual recording and reproduction, the editing system of the present invention utilizes a synchronous, continuous recording and play back. That is, all of the disc drives are operated in sync with each other as opposed to the random orientation of disc drives in the usual digital applications. In order to accomplish this, all of the N-drives must rotate at exactly a precise rate and be position-phased with respect to each other. Commands are sent to them for the head select and cylinder select for the next rotation synchronously with the drive rotation. This signal is not immediately acted upon, but the signal is merely enabled and actuated by the next vertical sync signal. In a typical embodiment, commands to set heads are issued every half rotation or every vertical field of video. In other words, the drives are modified to allow asynchronous commands followed by synchronous strobe (vertical sync pulse), with a servo-system to maintain synchronization among the disc packs.

Thus in summary, the control of the disc drives 50 relies on position control from one revolution to the next, rather than using a clocking arrangement as is the case for disc drives in the usual digital applications.

Thus far, the portion of the block diagram of FIG. 2 which has been discussed involves the record electronics and the disc drives. The next part of the system to be discussed is the read or play part of the system.

Coupled to the output of the N-disc pack/drive 50 is an N × 2 switch 54. N × 2 switch 54 comprises a set of general purpose solid-state switches under computer control as will be explained. The computer, through the switch control circuit 56, provides logic commands to the N × 2 switch 54 for directing the stored encoded video information from the N-disc pack/drives 50 into one of two output channels. Thus at any one time, one disc-drive can be connected to one of the output lines of the N × 2 switch 54 and a second drive to the other output line. A 6 × 2 switch refers to a particular embodiment for a system with six drives and two video channels; other numbers of drives and channels are of course equally possible.

A two-channel limiter 58 which can be a conventional circuit such as typically used FM or PIM detection circuits, takes the RF signals from the N × 2 switch 54, which vary in amplitude, and limits the amplitude of these signals to a relatively constant amplitude of about 1 volt, peak-to-peak.

Limiter 58 provides a similar function as a limiter which is located in each of the demodulators 60. But whereas the limiter in the demodulator, which will be illustrated in more detail subsequently, limits the signal received from the respective skipfield play assemblies 62, the two-channel limiter 58 limits the signal received from the N-drives 50 via the N × 2 switch 54.

Real time playback of information from the disc packs where there normally would be hardware conflicts which prevent cuts from one piece of material to another can be avoided by means of RF dubbing or transfer recording. Such conflicts would exist if the editor wishes to make a cut from information, either video or audio, stored, for example, on the inside of a pack to information stored on the outside of the same pack. In the case of a conflict the head positioned on the pack normally takes between about 12 to 80 milliseconds to move from one point on the pack to another. This normally results in a disturbance of the picture and audio information as a result of the time required by the head to move to another position on the same surface. To avoid this conflict means are provided for transferring recordings of information from one portion of the pack to a second pack or packs so that the transfer in real time playback is not done directly from the one point on one pack to a second point on the same pack but from one point on the pack to a reserve space on an auxiliary pack and then back to the second point in the pack. During the playback from the auxiliary pack, the head on the main pack has sufficient time to move to the second point on the pack. Consequently, continuous non-interrupted playback is accomplished. One such transfer must be made for each edit transition within a given disc pack if conflicts exist.

By transfering a minimum of two to four tracks of information onto four reserved cylinders located, for example on the outside of one of the disc packs and performing the switching from the main pack to the auxiliary pack and back to the main pack, continuity in the video and/or audio is insured. Four such reserve cylinders in the present skipfield system would provide 80 field pairs and would provide sufficient conflict capacity for normal editing requirements, where four or more disc packs are used in the system.

The programmed computer 66 determines whether such a file conflict occurs. Once it is determined that a conflict will result, the computer directs the hardward for implementing the file transfer. This occurs prior to the initiation of the playback by the editor so that once the playback begins, it continues uninterrupted.

There are some situations in which larger transfers are required, i.e., where the entire cut must be transferred. This would require greater than four reserve cylinders. This occurs, for example, where the audio from one take is combined with the video from another take and both takes are on the same pack.

To implement transfer of signals between packs due to file conflicts the output from the N × 2 switch 54 and limiter 58 is routed back through an RF dub switch 64 to the RF distribution amplifier feeding the N-drives 50. The RF dub switch 64 is controlled by the computer 66 through the switch control circuit 56. Under the direction of the programmed computer 66 the RF dub switch 64 is turned on when it is desired to circulate RF video signals from one disc pack to another.

From the two-channel limiter circuit 58, each channel of video is processed in the same manner by parallel electronic circuitry. The following description, for purposes of illustration, relates to only one channel. It should be understood that identical circuitry is used to process the other output channel. Each channel comprises a skipfield play circuit 62 (which includes a skipfield recording disc), a demodulator 60, a noise reduction system 68 (optional), and an output processor circuit 70.

The audio playback electronics include an audio playback circuit 72 and an audio output circuit 73. The frame code processing circuitry includes a frame code play circuit 75 and a frame code output circuit 76.

The skipfield playback circuit 62 is responsible for converting the skipfield format of the recorded video into a format suitable for viewing. The switching functions of skipfield play system 62 are under the control of the skipfield control 49. Basically, this is accomplished by repeating each field twice. Details of this operation will be discussed in more detail subsequently.

Demodulator 60 provides several functions. First, it demodulates the RF video signals (PIM) back into video signals. Secondly, it provides a separate output for the audio PAM and frame code pulses for further processing. The audio output is sent to the audio monitor 77 at the editor console.

The audio play circuit 72 converts the audio PAM pulses into normal audio frequencies in a proper time sequence.

The demodulated video signals with the modified sync signals are then sent to the output processor circuit 70. This circuit strips out the video signals from the modified sync. It then reconstitutes normal sync signals thereby forming a standard format. The video information stored in the disc packs contains a modified sync format with very narrow horizontal sync pulses compared with the normal format and without the vertical synchronizing pulse normally contained in standard television signals. The lack of a vertical pulse makes it impossible for normal television monitors to synchronize with these signals. This lack is due to provision of encoded audio as recorded on the disc packs. To display the video on monitor 79 and 80 located on the editing console 81 it is necessary to reinsert a vertical sync pulse and provide the capability for blanking out the audio and frame code signals in the vertical interval.

From the output processor circuits 70 the respective channels of video signals are sent to a video switch/fade circuit 82. Such circuits are commercially available, such as Grass Valley Model No. 931. The prime function of the video switch fader 82 is to switch the two playback channels to either the left or right monitor 70 and 80 on the editing console 81. In addition it has the capability of doing several other things. It can mix channel 1 and channel 2 so that the editor can have the capability for fades and dissolves; that is, the editor can overlay one picture on top of another with varying percentages of the two signals. Additionally it provides the capability of adding generated characters to one of the video signals. The generated characters are displayed on the monitors for the editor and are used, as explained later, by the editor to command the operation of the editing system.

Also associated with the computer 66 is a character generator 84 for the television screens of the left and right monitors 79 and 80. A character generator interface 86 provides the interface between the character generator 84 and the computer 66. The character generator 84 may be of conventional construction, such as the type made by Computer Communications Inc. of Inglewood, Calif. The Computer Communications character generator includes a light pen 83, identified as a CC–304 light pen which employs a phototransistor detector and includes an interrupt switch. The character generator of Computer Communications Inc. is identified as a CC–301.

The light pen 83 is used by the editor in conjunction with the displays on the left and right monitors to convey instructions to the computer. When the light pen is directed toward the display and light from the display is first detected by the pen, the searching operation of the light pen ceases and the address of the detected light is retained in a light pen address register within the generator. Characters presented on the display represent a choice of commands which can be given to the computer. These characters are generated by character generator 84 which sends its signals, as described above, to the monitors via the video switch/fade circuit 82. A marker appears on the display device which indicates the position to which the positioning of the light pen corresponds. This marker is an intensity illumination of the character background.

To transmit the character position stored in the light pen address register to the computer 66, the interrupt switch on the pen is depressed. This switch activates an interrupt condition within the light pen logic and causes an interrupt code to be transmitted to the computer 66 by the character generator 84. The interrupt code or status word contains a bit which indicates that a light pen interrupt condition exists. Until the status word is read by the computer, the light pen is logically locked out from the computer 66. However, after the light pen address is read by the computer, the marker disappears from the face of the display device and the light pen is again ready to search.

The computer decodes the address in the light pen address register into an instruction which either implements a series of functions within the computer or readies the computer for further instructions to be received from the light pen. It will be noted that by using a Computer Communications Inc. light pen of the above-described type, the operator of the computer can determine whether the character position on which the light pen is positioned corresponds to the instruction which he desires to generate before such instruction is transmitted to the computer. It is only after the operator has addressed a particular instruction and depressed the interrupt switch on the pen that the instruction is decoded by the computer 66 and employed to initiate a sequence of events within the computer. It will be appreciated that while the light pen character generator described herein is particularly suited to convenient operation of the disclosed editing system, other interface terminals could be utilized if desired, such as keyboard, push buttons, joystick, etc.

The editing console 81 includes the left and right monitor CRT screens 79 and 80, audio monitor 77, as well as the light pen 83. An intercom (not shown) may also be provided for communication between the equipment room, housing all the disc drives and the electronic equipment, and other facilities such as the editing console. Various other buttons, switches, etc. may also be located at the editing console 81.

Editing decisions made by the editor are conveyed to and stored by the computer 66 via the light pen 83. The decisions are then assembled into a list by a suitable computer program. When the editing session is completed the list of decisions is transmitted from the computer to a teletype machine 87 and normally both printed on paper tape or on a sheet of paper and punched out on paper tape. Of course other input/output devices could be used.

The Computer 66 can be, for example, a general purpose digital computer of the PDP–11 type manufactured by the Digital Equipment Corporation (DEC) of Waltham, Mass. The DEC computer includes as a standard input/output device such as a teletypewriter 87 having a keyboard for loading instructions into the computer 66 and a printer for producing a hard copy of the information retrieved under program instruction from the core memory of the computer. Also included as an input/output device optional with DEC equipment is a paper tape punch and reader for punching out a computer program on paper tape and for responding to such punched paper tape to control the operation of the computer 66. The input/output devices are of conventional construction and of the type generally supplied with digital computers.

Drive interface block 88 is connected between the computer 66 and the N-drives 50. It is of standard design and comprises a set of printed circuit boards which provide the control interface between drive 50 digital circuitry and the computer 66.

The switch control 56 is used to give logic commands to steer signals throughout the entire system. The places where these logic commands are given are indicated by the short arrows. For example, there is a short arrow into the N × 2 switch 54. This arrow indicates that switch control 56 is connected to the N × 2 switch 54 and provides logic commands into that switch for steering or selecting the signals. In this particular case the switch control 56 which operates under the control of programmed computer 66 selects one of the N-drives 50 and connects it to one of the output lines by use of the N × 2 switch 54.

The hatched lines shown in FIG. 2 are the timing and frame code lines. An extensive synchronizing system is built into the editing system to insure that the timing of all of the drives is in step with the video information signals; and that the timing of all of the audio and frame code information which is stored in the system is in time with the sync coming back from the video. In particular, the drives 50 are synchronized by the H and frame pulses. The double lines indicate control under the direction of the computer 66 derived by some logical commands based on inputs through the teletype or paper tape or other storage media. The commands generally are simply made to on/off switches for the various functions. There is relatively little distinction between the two types of lines except that the signals which are the hatched lines operate more or less independently of the state of the hardware. That is one can leave the double line in a fixed command and the hatched lines will change state according to the timing of the input signals.

The synchronizing system for the entire editor system comprises a block 91 and sync circuit 92. The latter is used to synchronize the editing system with external devices and systems. Also these blocks provide the capability of synchronizing the system in the event that there is no sync in from the outside world. The clock 91 in the present system comprises a 16 MHz clock which is counted down to develop pulses at the normal rates of the vertical and horizontal scan lines in the television picture.

When there is an outside source the sync, which we call V-pulse and H-pulse for the composite sync on the single cable, is fed into the synchronizer 92 and the editing system can lock up to the external sync source. "Locking up" means several things. The servos of the N-drives 50 are slaved to the sync signals developed by the sync circuit 92 and therefore the video is thereby slaved to within the time space of the jitter of the servo system. As a result the switching of the record/play heads and the RF path switching, etc., is accomplished with this vertical sync. Switching noise pulses which occur, occur in the vertical interval in the television picture and therefore they are blanked out and do not appear as pop marks, spots, etc., in the picture. Thus by doing the switching in the vertical interval some picture degradation due to the switching is avoided.

The clock board 91 has one other major function. It provides a timing operation based on inputs from the input and output processors 38 and 70, respectively, and this timing is used for generating timing signals for the audio encoding & decoding, & frame code encoding and decoding. The basic principles used in this operation is that of a gated clock. A "window" for the audio is opened, based on the receipt of sync from the input or output processor 38 or 70 depending on whether the system is in the record or play mode. To insure that the audio PAM pulses are recorded and/or played back at the proper time, that is, that the system opens the audio "windows" at the proper time, the H-sync pulse is examined in the synchronizer to determine that it occurs at the proper time. If it is properly timed it is referred to as a Valid-H pulse.

The clock is used in the absence or as a substitute for an external sync source. The sync circuit 92 operates either from the internal sync, which is generated by the clock or from an external sync, which is generated, as explained above, somewhere in the outside world, such as in the television station. It provides not only pulses which have approximately the same timing as the external source, that is, pulses at the horizontal rate and vertical rate of a standard television picture, but also other timing pulses which are used in the system, such as 1 MHz pulses.

The audio timing circuit 94 generates gating pulses which are fed to the audio record circuit 36 and the audio playback circuit 72. These are windows or gating pulses which are timed relative to horizontal sync to open audio windows. By a "window" it is meant that an interval is provided during which the audio can be, for example, encoded in the video. As previously explained, the window occurs in the backporch of the horizontal interval. As previously explained two audio pulses are recorded per horizontal line in the skipfield mode and the first audio pulse is recorded starting approximately 4 microseconds after the leading edge of horizontal sync and ending approximately 8 microseconds after the leading edge of horizontal sync. The second audio pulse is recorded immediately following the first one and has a duration of approximately 4 microseconds. The exact timing and pulse size could obviously be changed from one application to another. The same timing circuit generates pulses for playback timing also. In this particular case the playback pulses are gates opened within the corresponding record times generally one-half to 1 microseconds guard bands from the edge of the record windows so that switching transients or timing errors in the systems will not adversely effect the audio quality. Thus the final output audio PAM pulses appear as shown in FIG. 8B, somewhat reduced in size from these at the input (FIG. 8A).

As optional equipment, an output recorder 97 is provided. This recorder may be, for example, a standard video tape recorder. This recorder makes a real-time work print of the final rehearse sequence made by the editor. Of course, this is supplemental to the rehearse list compiled by the computer 66.

The basic function of the E—E (Electrical-Electrical) switch 96 is to connect the modulator 42 output to the demodulator 60 input so that the recording media can be by-passed in order to test the performance of all of the electronics that processes the input video into RF form. and then back from RF form into video. This allows one to test both audio and video or any other signals all the way through the electronic path without actually going through either the skipfield disc 404 or the disc packs 50.

A picture monitor control 98*a* with a corresponding video wave form monitor 98*b* provides an output display for viewing, at the central processing area, both video output channels and selected other monitor points.

The frame code control 99 provides the basic control over frame code record 40, frame code play 75, and the frame code output circuit 76. Frame code control 99 is under the supervision of computer 66. It insures that the frame code signals are properly timed for insertion in the vertical intervals.

SKIPFIELD/SKIPFRAME OPERATION

Figure 3A:
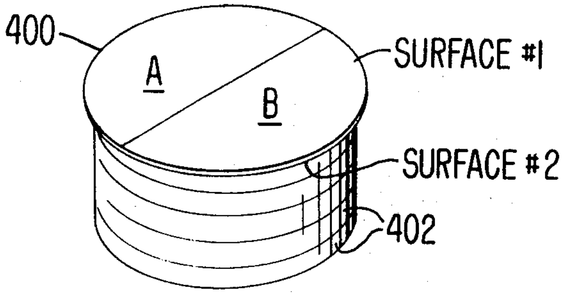
FIGS. 3A–3D illustrate skipfield and skipframe recording modes in accordance with the invention.

The principles of skipfield operation can best be understood by reference to FIGS. 3 and 4. Shown schematically in FIG. 3A is a disc pack 400 comprising a plurality of recording discs 402. In one embodiment each disc pack has 20 recording surfaces, which may include recording on only one side of a disc or on both sides. The following discussion relates to a typical embodiment intended for operation in 60Hz, NTSC video format, and does not exclude other formats, frequencies, or speeds.

As previously explained, video broadcast signals comprise a sequence of video frames, each frame consisting of a pair of fields. Each field is formed by 262½ scan lines and each field within a frame is alternated as to vertical timing so that the two fields per frame are interlaced. It takes one-sixtieth of a second to display a field or 1/30th sec. to display a complete frame. Each scan line takes approximately 63.5 microseconds and is triggered by a horizontal sync pulse. After the completion of each displayed field, a vertical sync pulse triggers the CRT back to the top of the screen and a new field is then started.

The disc pack 400 typically is driven at 1,800 rpm so that each revolution takes 1/30th of a second. Since it takes one-sixtieth of a second to generate one video field, exactly two fields of video are recorded on a disc 402 corresponding to one revolution of the disc pack. Thus each disc surface can be considered to have two recordable regions, designated A and B.

Figure 3B:
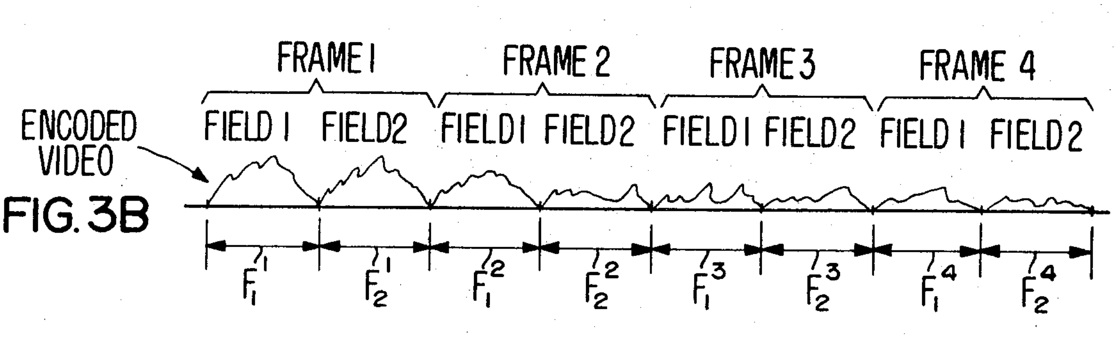

FIG. 3B shows the output from the modulator 42. The audio PAM pulses and frame code information signals are encoded in the video, and the video is in PIM form. Note that at this point each frame of video includes two, interlaced, video fields.

In skipfield recording only one field of video is recorded per frame. When replayed, each field is duplicated (and interlaced) to produce a fairly accurate reproduction of the original video sequence.

Thus in FIG. 3B only one field per frame, in this case field 2, is selected for recording on the disc. In order to then sequentially record, for example, $F_2^1$ and $F_2^2$ (field 2 of frame 1 and field 2 of frame 2) on the same surface field $F_2^1$ must be delayed until the pack is in the proper location for $F_2^1$ to be recorded. As will be explained, this delay is performed by a skipfield record disc 404, which is shown schematically in FIG. 4.

If, for example, $F_2^1$ and $F_2^2$ are recorded on surface 1, first cylinder, then the next pair of fields, $F_2^3$ and $F_2^4$ are recorded on surface 2 of the first cylinder. The activation of the correct head is controlled by operation of the record/play electronics associated with the disc drive.

After all of the tracks of a cylinder are recorded, the heads are moved to the next cylinder and the above procedure is repeated until all of the cylinders are recorded and then another disc pack must be utilized. With the skipfield organization outlined above, there is sufficient time between fields to be recorded to allow the head mechanisms to move between cylinders. This additional time is provided because the disc pack rotates one revolution between each recording revolution.

There are of course, other ways in which the video information can be organized on the disc packs which are within the scope of this invention. For example, rather than storing two fields per revolution, only one field might be stored. The particular arrangement chosen here was thought to optimize storage capacity, speed, and hardware considerations.

Even with two fields per disc, other arrangements besides the preferred sequential arrangement could be used. For example, one half of each track, such as segment A could first be recorded upon by starting at the top of the cylinder and working downwards. Once at the bottom of the cylinder, the other half of each cylinder, such as segment B, could be recorded upon, with the direction of the recording being from the bottom to the top of the pack. Note that in this arrangement, the disc pack rotates only one-half revolution between recordings, except for the bottom disc where two fields would be recorded in sequence or there would be one full revolution before recording a subsequent field. The important thing to note is that a recording can be made with one-half or a multiple of one-half revolutions between fields. The preferred embodiment was selected over other such arrangements primarily because of considerations involved in playback. It was found that the preferred arrangement described above permitted much greater flexibility for hardware operation during the reproduction of the skipfield recording.

As explained above, and as will be explained in greater detail subsequently, each field of video recorded on the discs includes audio PAM samples for both the recorded field and the field which was eliminated.

Figures 3C, 3D:
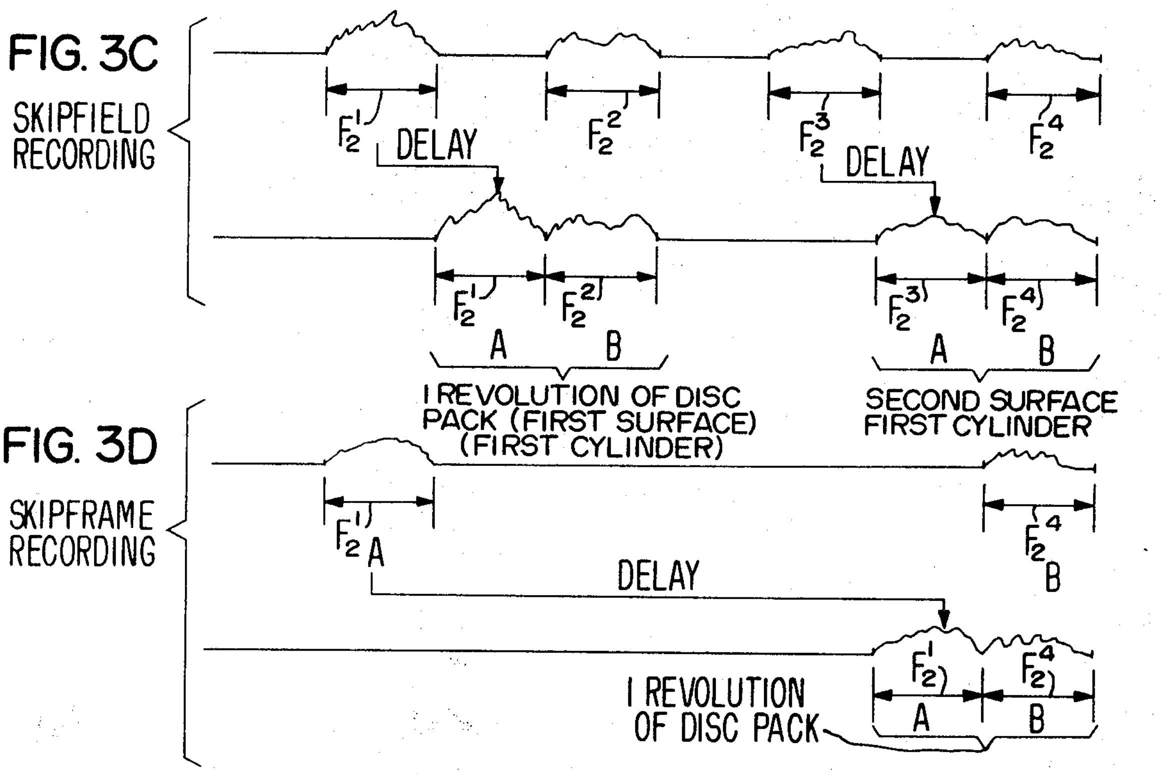

FIG. 3D illustrates a manner by which even larger amounts of recorded information (takes) can be stored in the disc packs. Here only every other frame is recorded, with only one field per alternate frame being recorded. Thus only one out of four fields is actually recorded.

Skipfield playback can best be understood by reference to FIG. 4. Skipfield is provided with two channels, one for the A and the other for the B portion of the discs. The skipfield disc 404 is rotated at 3,600 rpm so that one field is recorded per revolution. Segment A is recorded on channel 1 and segment B on channel 2 of the skipfield disc 404 as shown in FIG. 4B. Actually, skipfield disc 404 includes two additional channels since the editing system has two system playback channels, one for each of the output monitors. However, only one such system channel will be described and the disc 404 has only been illustrated with a pair of skipfield channels.

Figure 4A:
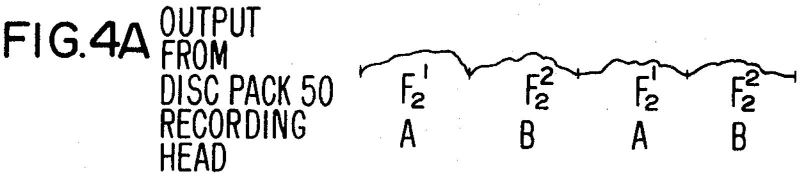
FIGS. 4A–4D illustrate skipfield and skipframe reproducing modes in accordance with the present invention.
Figure 4B:
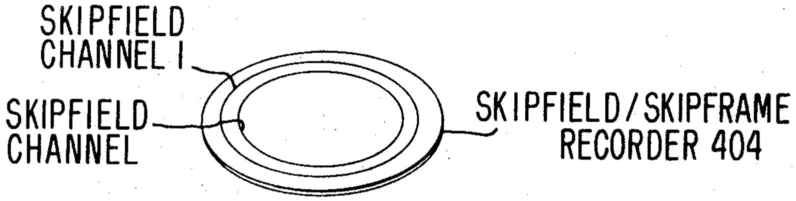
Figure 4C:
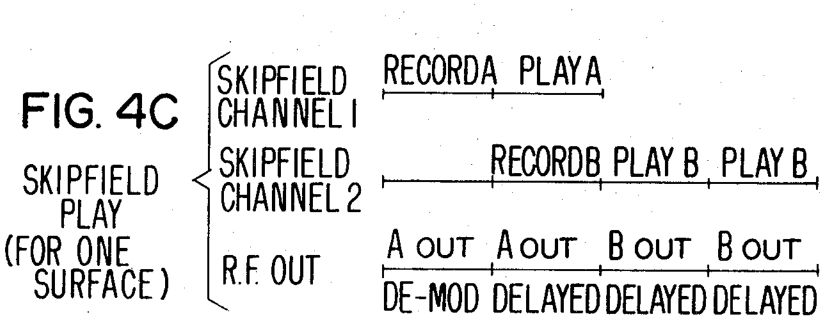

The output from one of the skipfield play blocks 62 is shown in FIG. 4C and labeled RF out. It can be seen that the output consists of a sequence of duplicated fields.

In particular, the first output field, A, corresponding to $F_2^1$ (see FIG. 4A) is played out directly to the demodulator 60. At the same time, this same field is recorded on skipfield channel 1 and then immediately replayed after the field is played out from the demodulator 60. The reason that it is necessary to record field A and then replay it is to allow for the disc pack 50 to rotate to the proper position for system playback. The following description describes a typical skipfield mode operation, i.e., normal forward speed play. Of course other modes of operation are possible such as jog (one frame at a time), slow forward, fast forward, slow reverse, fast reverse, jog reverse, still frame, and search. The system record would usually be done in normal forward speed. However, the play could be done in any of the aforedescribed modes by light pen selection. The timing sequence of the skipfield channels is different for these modes. But these differences involve straight forward modifications of the timing to resolve continuous video playback problems.

One of the specific playback modes produces a still frame display. This mode occurs when the picture motion is commanded by the editor to stop motion. The still frame display is achieved by a continuous replay of the same single field from the skipfield disc. The single field may be artificially interlaced as explained subsequently. It will be appreciated by one skilled in the art that such a still frame display will be free from the motion flicker which would occur if both fields comprising a frame were repeated continuously. In a like manner since all frames displayed in any motion mode are produced by two plays of a single field, there will be no motion flicker in reverse modes of playback as would occur if each frame displayed was made up of two adjacent fields reproduced in the normal forward sequence.

After the second A out, B out is outputed. Since at this time the A and not the B field is being outputed from the skipfield recording head (see FIG. 4A), it is necessary to record B on the skipfield recorder 404 immediately prior to this point in time, and then replay B twice as shown. In this manner the original single field sequence recorded in the disc packs 50, as illustrated in FIG. 4A, is reproduced into a duplicated two-frame format shown as RF out in FIG. 4C.

Figure 4D:
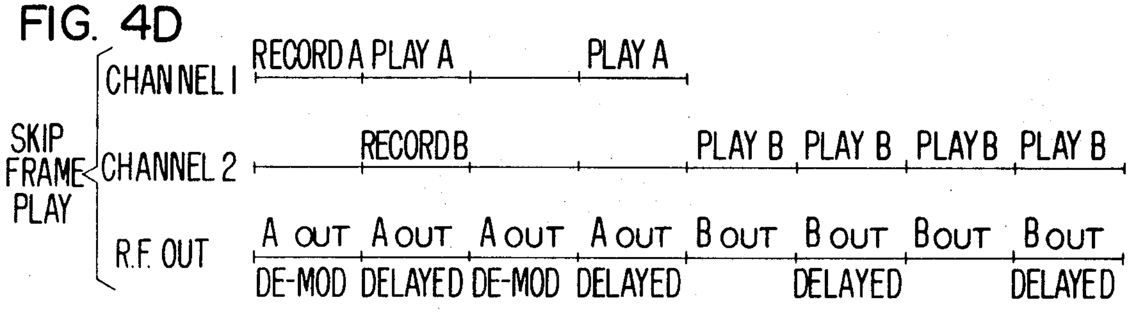

The operation of skipframe playback is shown in FIG. 4D. As can be seen the operation is similar to skipfield operation except that each field is played four times instead of two.

Figure 5:
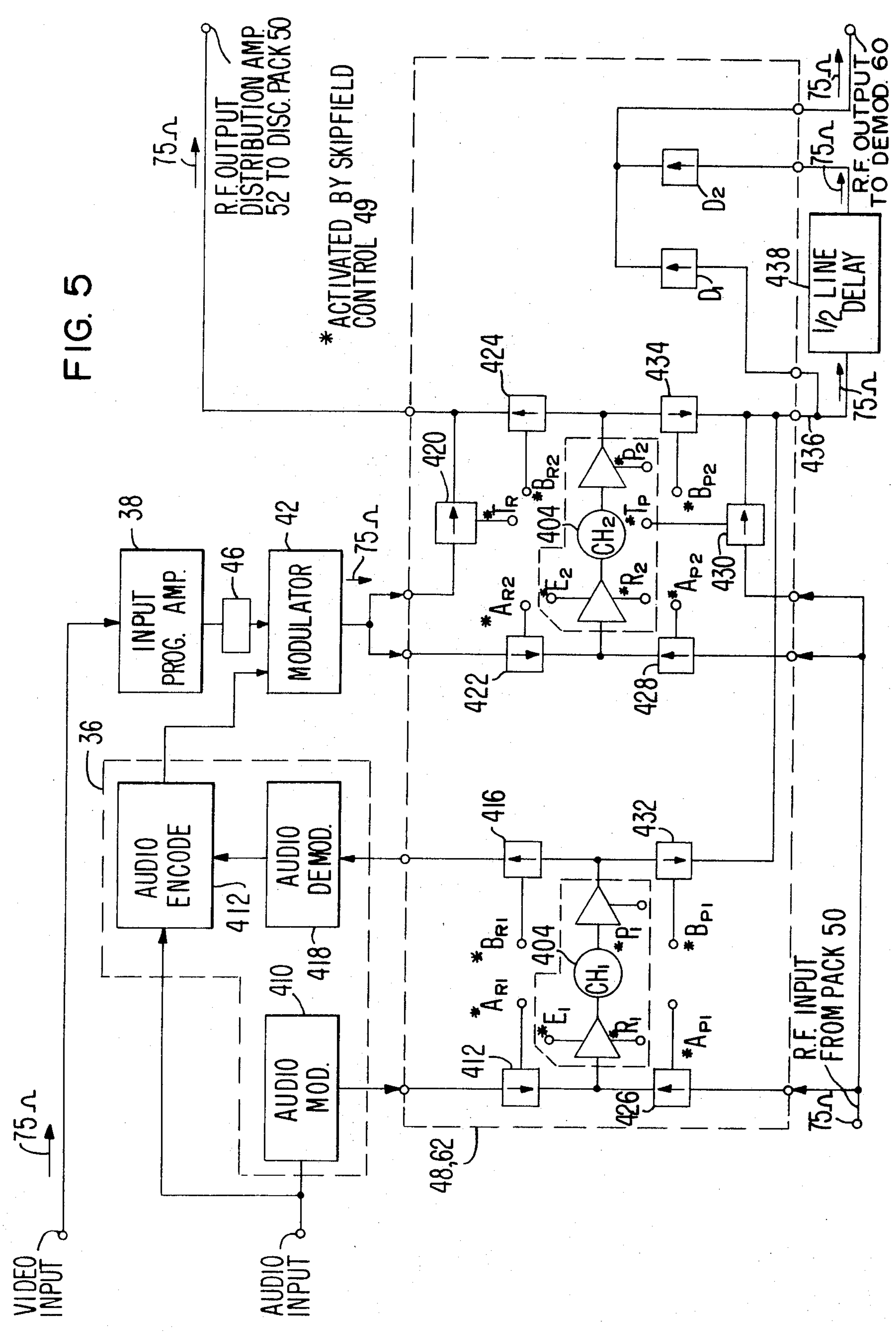
FIG. 5 is a schematic diagram illustrating skipfield operation in an improved editing system.
Figure 6:
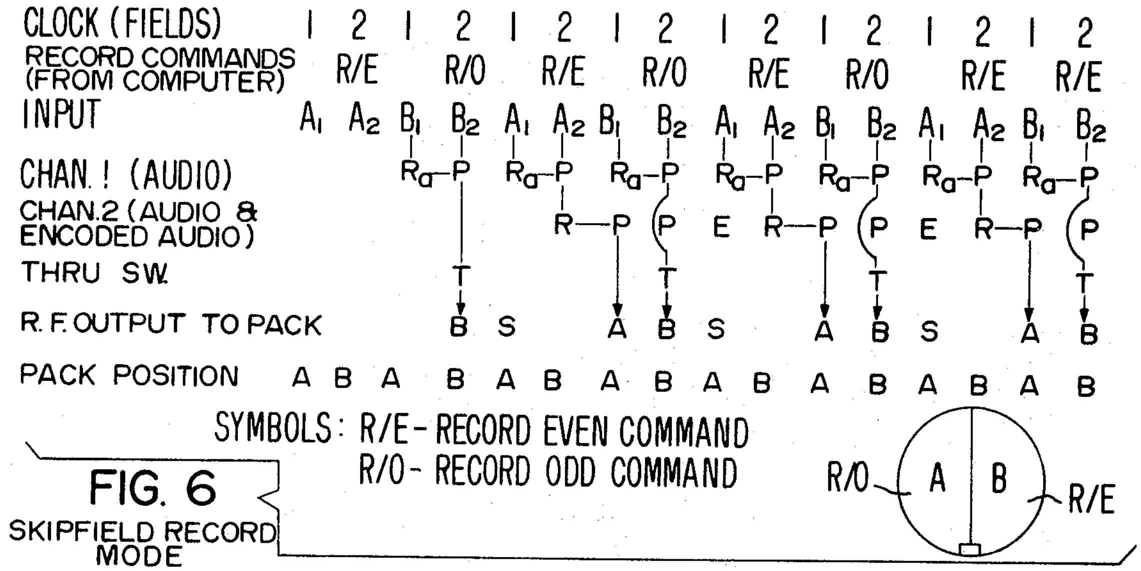
FIG. 6 and 7 further illustrate skipfield recording and reproducing.

Operation of the skipfield play and record systems 48 and 62 can best be seen by reference to FIG. 5 showing a block diagram including combined skipfield play/record circuit 48, 62 and audio delay circuit 44. Additionally reference is made to FIG. 6 during the explanation of the skipfield record mode and to FIG. 7 to skipfield play mode. These two figures summarize the flow of signals through the skipfield system during these modes.

SKIPFIELD RECORD MODE

During skipfield record only every other field of video is recorded. However, each field's audio is recorded. This is accomplished by "doubling up" the audio within each video field. The resulting encoded video signals are shown in FIG. 8A. This is accomplished by delaying alternate audio samples until the next video field.

Referring to FIG. 5 audio signals are inputed through two paths to the audio encode or multiplex circuit 412. The first is to audio modulator 410, and the second is directly to the audio encode circuit 412.

From the audio modulator 410 the modulated audio signals are sent through a switch 412 which allows signals to flow in the direction indicated by the arrow. This switch as well as the other switches described in this figure, are under control of the skipfield control 49 which in turn is computer controlled. To activate switch 412 and $AR_1$ enable signal is provided at the indicated terminal from the skipfield control 49.

The audio signal is then recorded on channel 1 of the skipfield record disc 404, delayed and then played out through switch 416 (activated by $BR_1$ enable) to audio demodulator 418, where the audio signal is demodulated back to its original form.

Thus audio encoder 412 is receiving two inputs: one directly and one delayed. The audio encode 412 alternately samples the direct and delayed audio, converts each sample into audio PAM pulses, and forms a composite audio signal. Each PAM pulse can, for example, be of a 4 microsecond duration forming an 8 microsecond composite audio signal.

Figure 22:
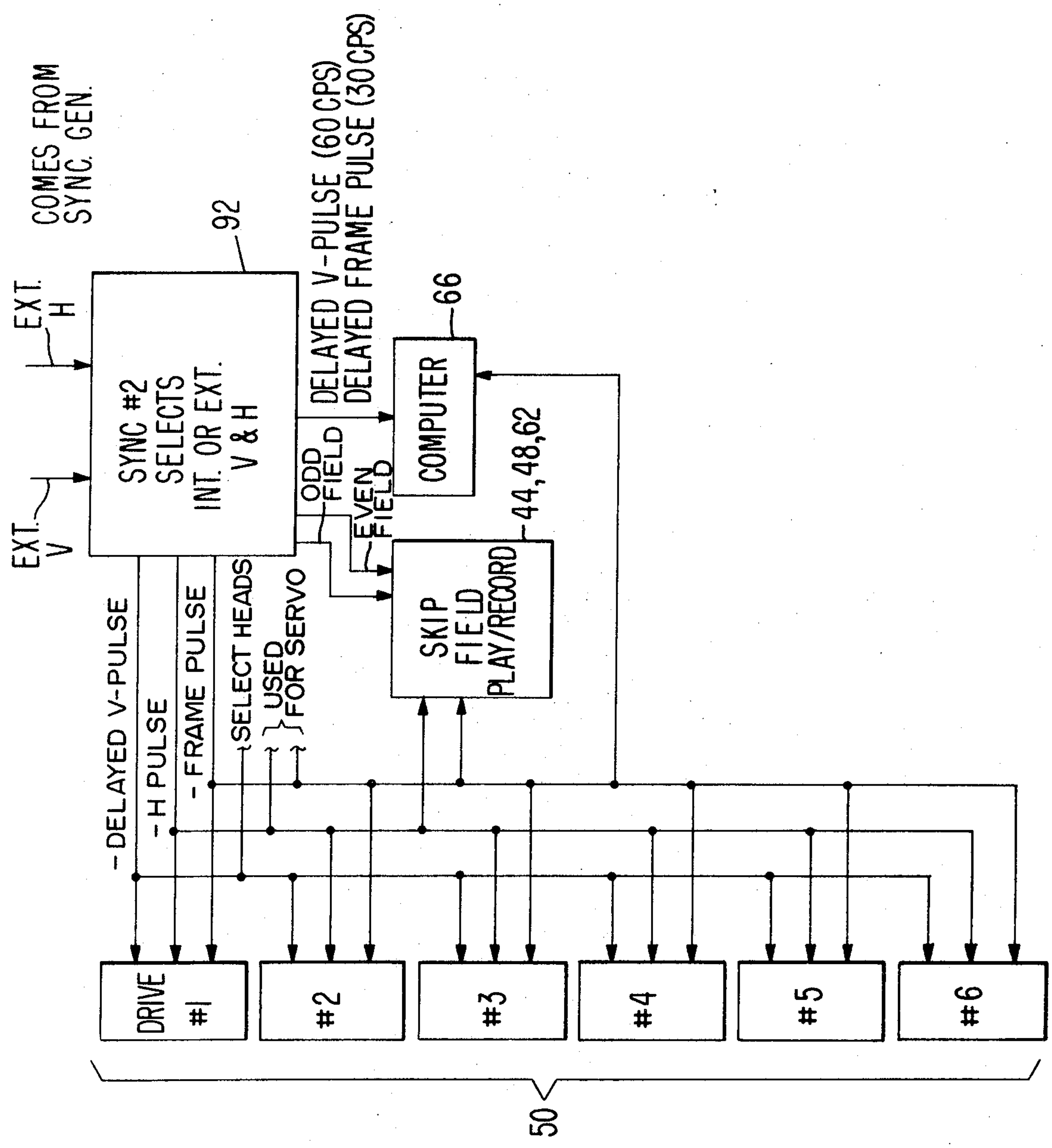
FIG. 22 is a block diagram further explaining the operation of the circuit of FIG. 21.

The composite audio then goes to modulator 42 where it is PIM modulated during the time of the backporch of the horizontal interval of video. Details of a normal television horizontal interval are shown in FIG. 22, The modulated RF output from the modulator 42 is shown in FIG. 8A. This signal is referred to as PIM output (RF).

The RF is then directed along two paths. The first is through a through-switch 420, activated by a TR command from the skipfield control 49, to the disc pack 50 via the distribution amplifier 52.

The other path takes the RF through switch 422 activated by an $AR_2$ command, to channel 2 of skipfield disc 404 where the signals are delayed and then sent out through switch 424, activated by a $BR_2$ command, to the pack 50 via distribution amplifier 52.

Skipfield switches 422 and 424 and through-switch 420 are activated so that the composite RF video signals sent to the disc packs 50 are alternately sent from the modulator 42 to the pack 50 and then delayed from the skipfield disc recorder 404. As previously explained the delay path is required in order for the pack 50 to rotate to the proper position to accept the alternate field.

SKIPFIELD PLAY MODE

In the playback mode the RF recorded on the disc packs 50 is routed to one of three switches; a channel one record switch 426, activated by a $AP_1$ command, a channel two record switch 428, activated by a $AP_2$ command, and a by-pass or through-switch 430, activated by a TP command.

The channel 1 and 2 record switches 426 and 428 direct the RF to the respective channels of the skipfield disc 404 where each of the recorded fields is delayed as required and then played out through output switches 432 (activated by a $BP_1$ command) and 434 (activated by a $BP_2$ command) respectively to a common line 436 as required. The output from through-switch 430 is also tied into the common line 436.

Since each field consists of 262½ scan lines, in order to maintain interlace synchronization of the RF output from the skipfield play unit 62, a half-line delay 438 is provided. This delay is added to every other field by alternately activating half-field delay switches $D_1$ and $D_2$. The output from these switches then is sent to the demodulator 60. Operation without the delay is possible with certain types of TV monitors which have fast horizontal scan circuit time constants.

Figures 7, 24:
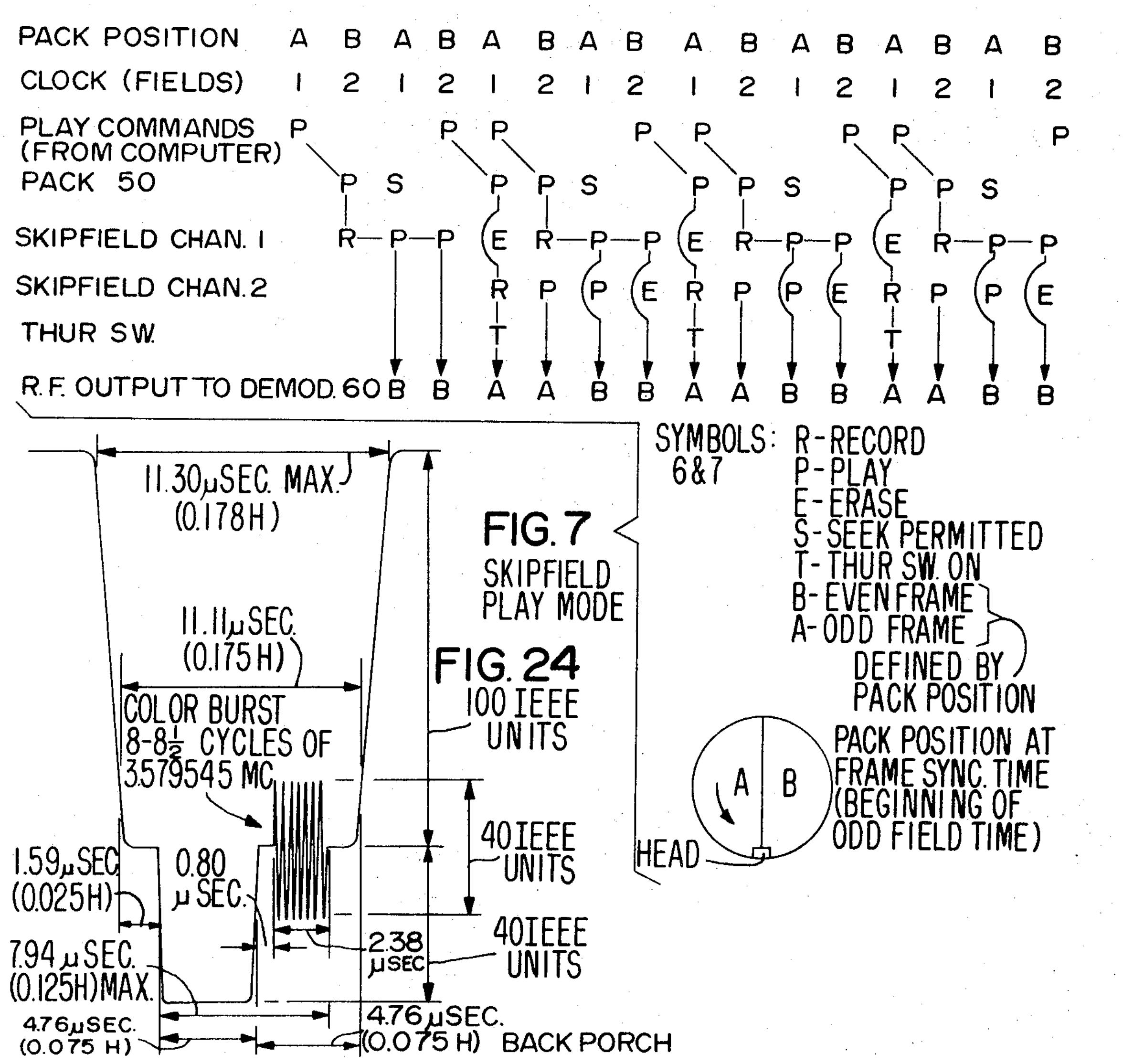
FIG. 24 illustrates a standard television horizontal interval.

One operational sequence of the skipfield playback mode is illustrated in FIG. 7, which further illustrates the general skipfield playback sequence shown in FIG. 4. Note that when the play command, P, is given the next following video field is taken from the pack 50.

In many applications it is not necessary to erase each field after recording it on a skipfield channel. All that is required is that the new field of video be recorded directly over the old recording. However, if a separate erase function is desired, FIGS. 6 and 7 have been provided with an erase symbol E provided at appropriate positions.

The symbol S — seek-through permitted — means that at this point in the timing sequence the recording heads can be moved to another position. At other times, this would not be permitted due, for example, to a recording or playback in progress.

Figure 9A:
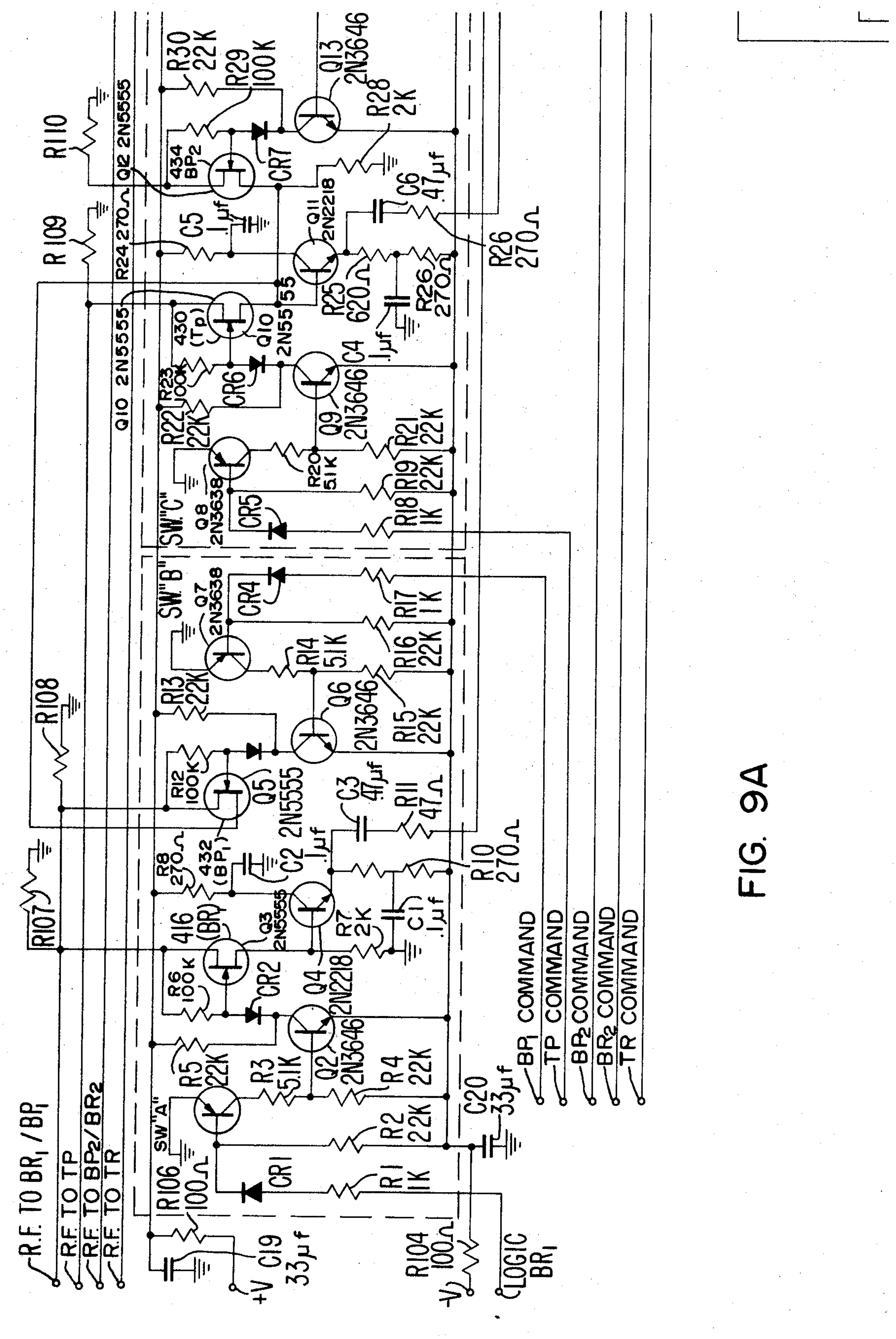
FIG. 9A, 9B, and 9C illustrates in greater detail the skipfield switching circuit of FIG. 2A and 2B.
Figure 9B:
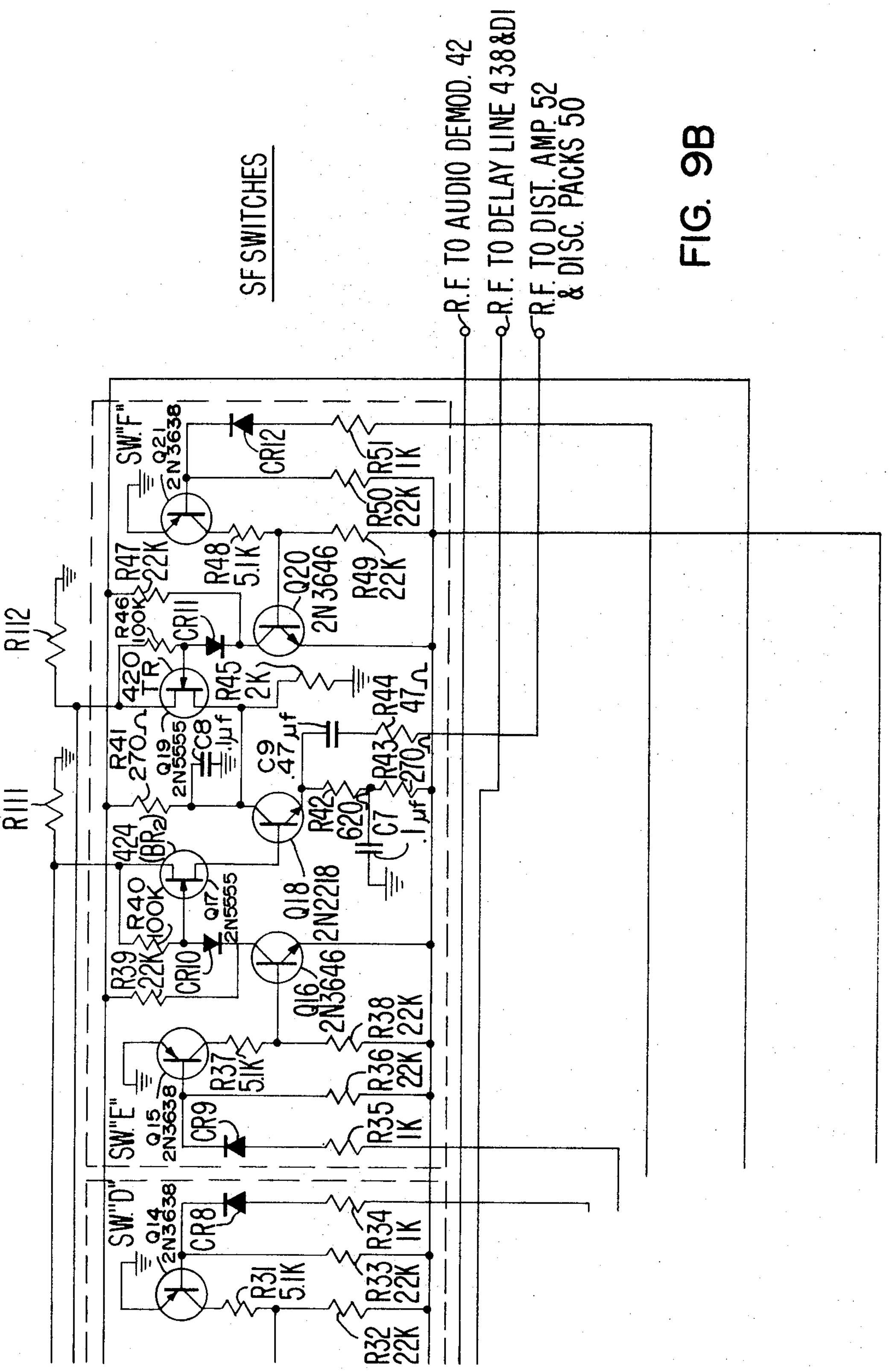
Figure 9C:
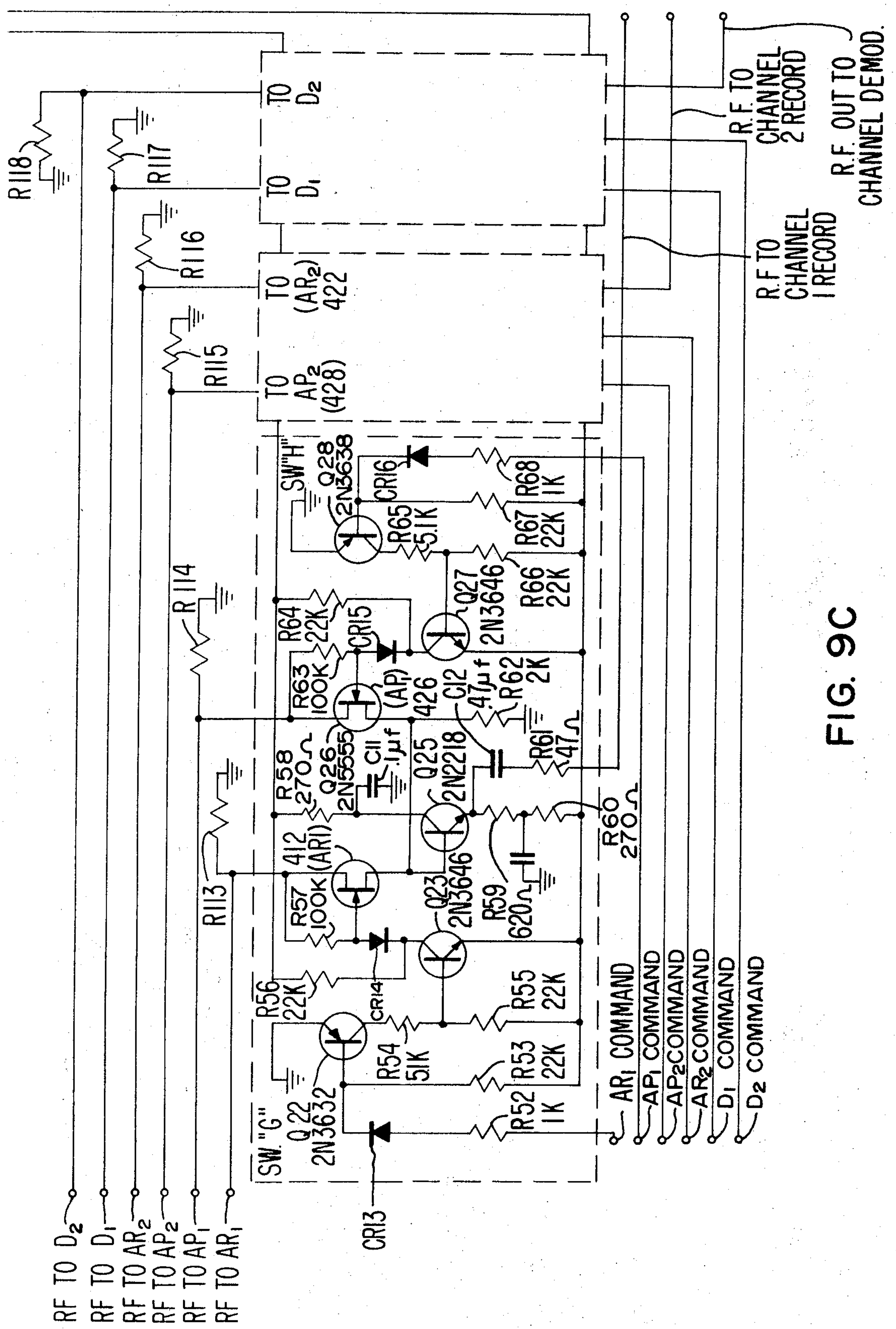
Figure 10A:
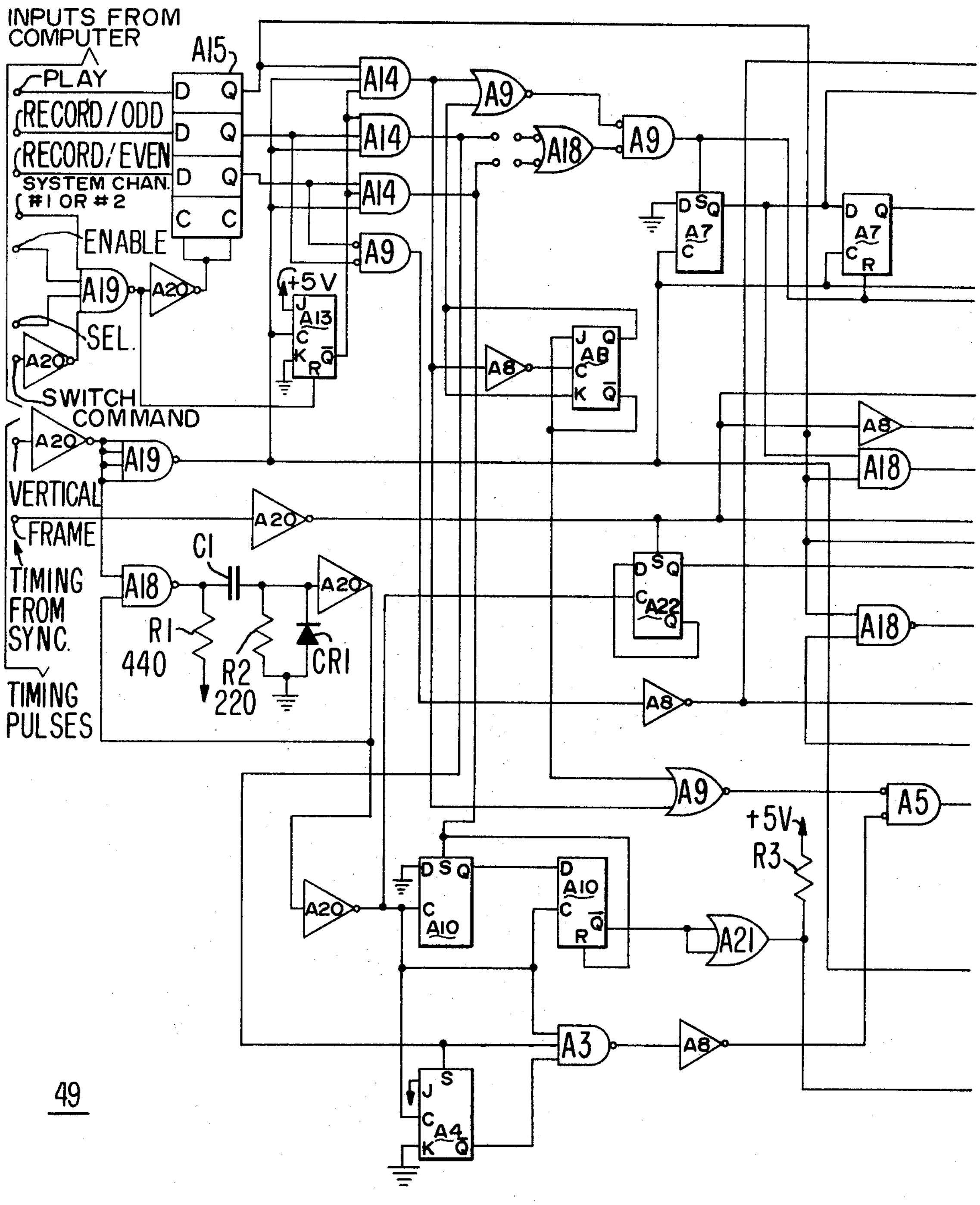
FIG. 10A and 10B illustrates in greater detail the skipfield control circuit of FIG. 2A and 2B.
Figure 10B:
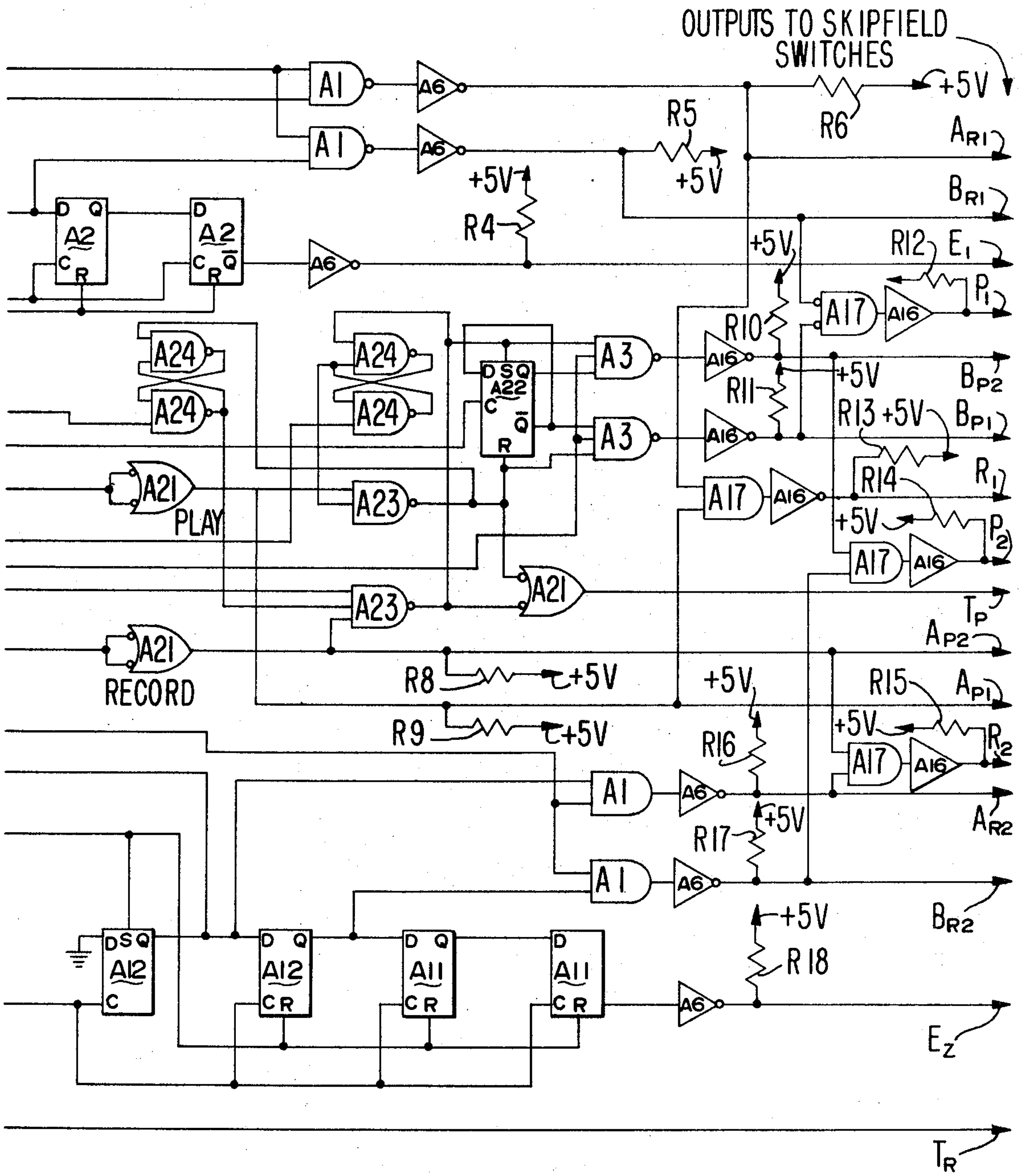

FIGS. 9A, 9B, and 9C are detailed schematics of one set of switches shown generally in FIG. 5. The skipfield switch commands for FIGS. 9A, 9B, and 9C are generated by the skipfield control circuit 49, one embodiment of which is shown schematically in FIGS. 10A and 10B. Computer commands and timing pulses are provided to the inputs of circuit 49 and the commands for the skipfield and through-switches are provided at the output.

MODULATOR 42

Figure 11A:
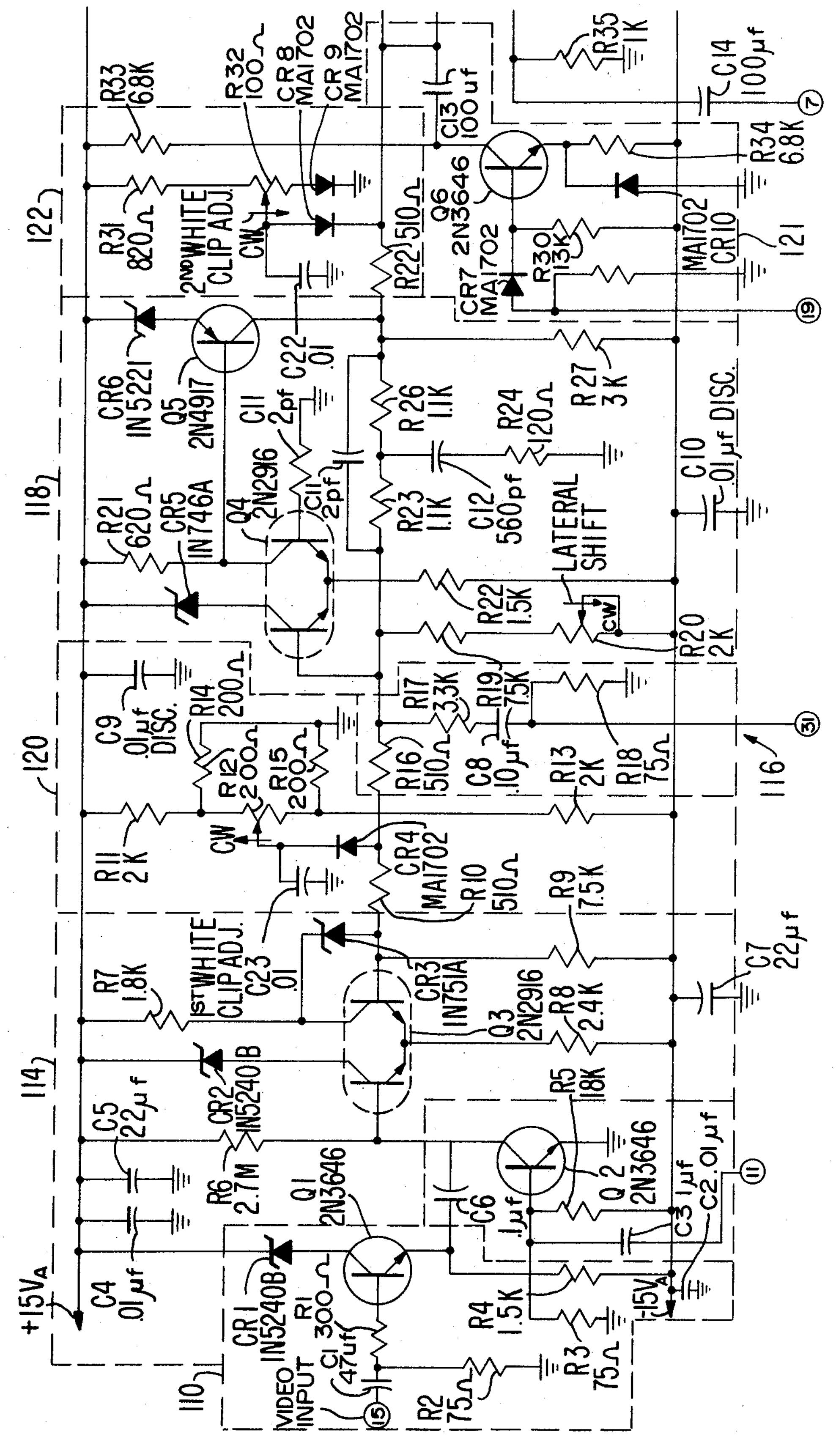
FIGS. 11A and 11B and 12 illustrate in greater detail the modulator circuit of FIG. 2A and 2B.
Figure 11B:
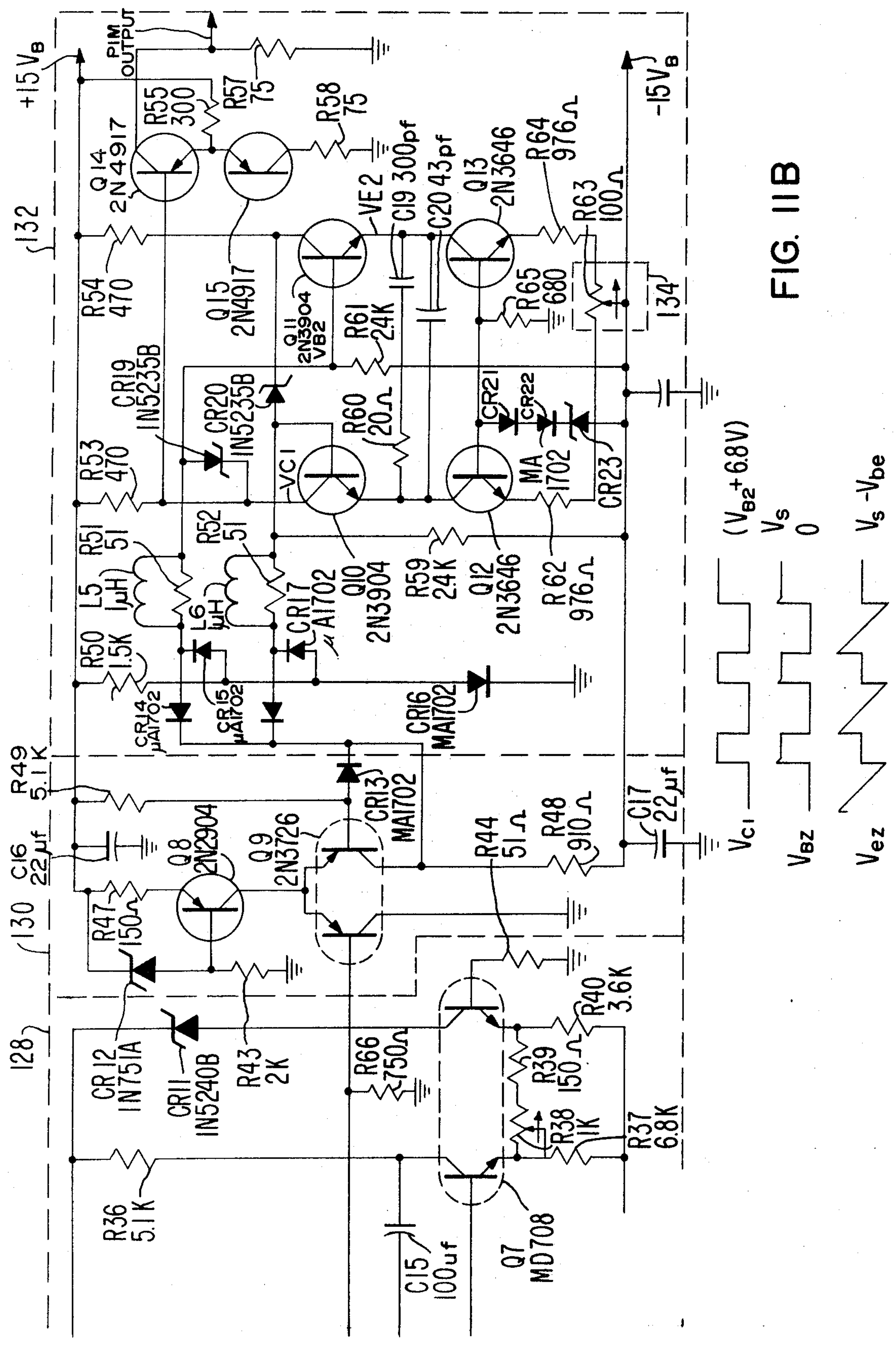
Figures 12, 14:
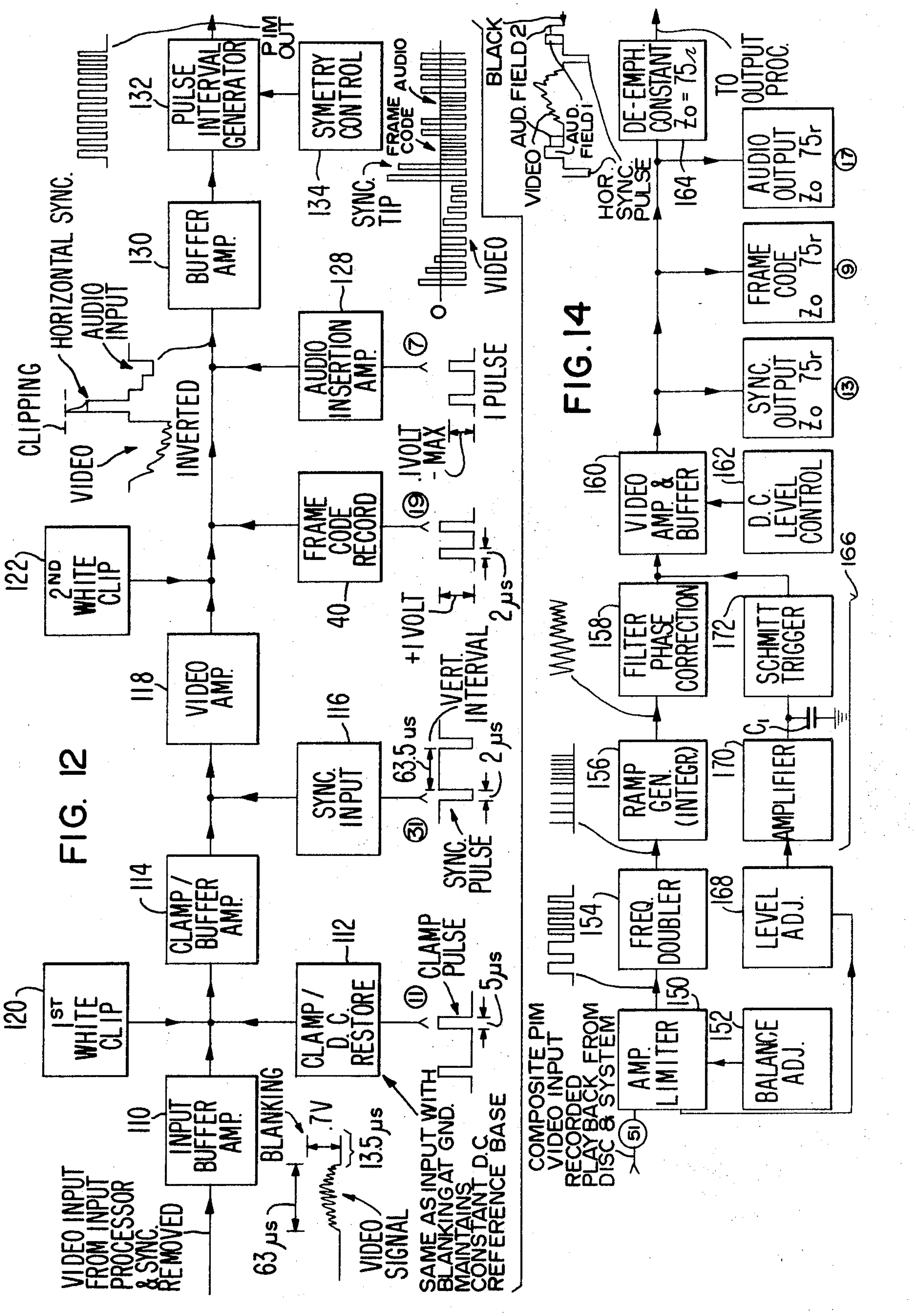
FIGS. 13A, 13B, and 13C and 14 illustrate in greater detail the demodulator of FIG. 2A and 2B.
Figure 13A:
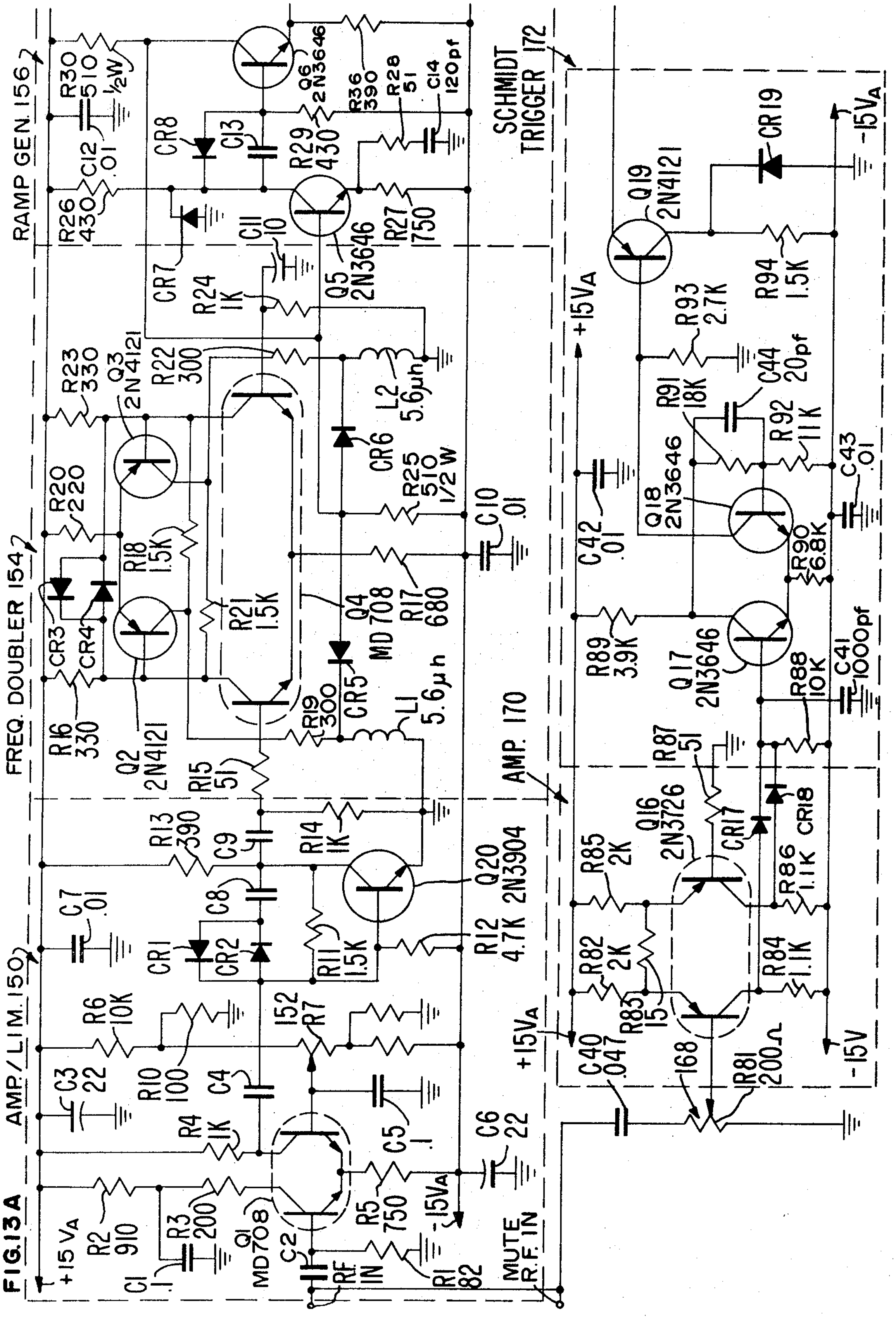
Figure 13B:
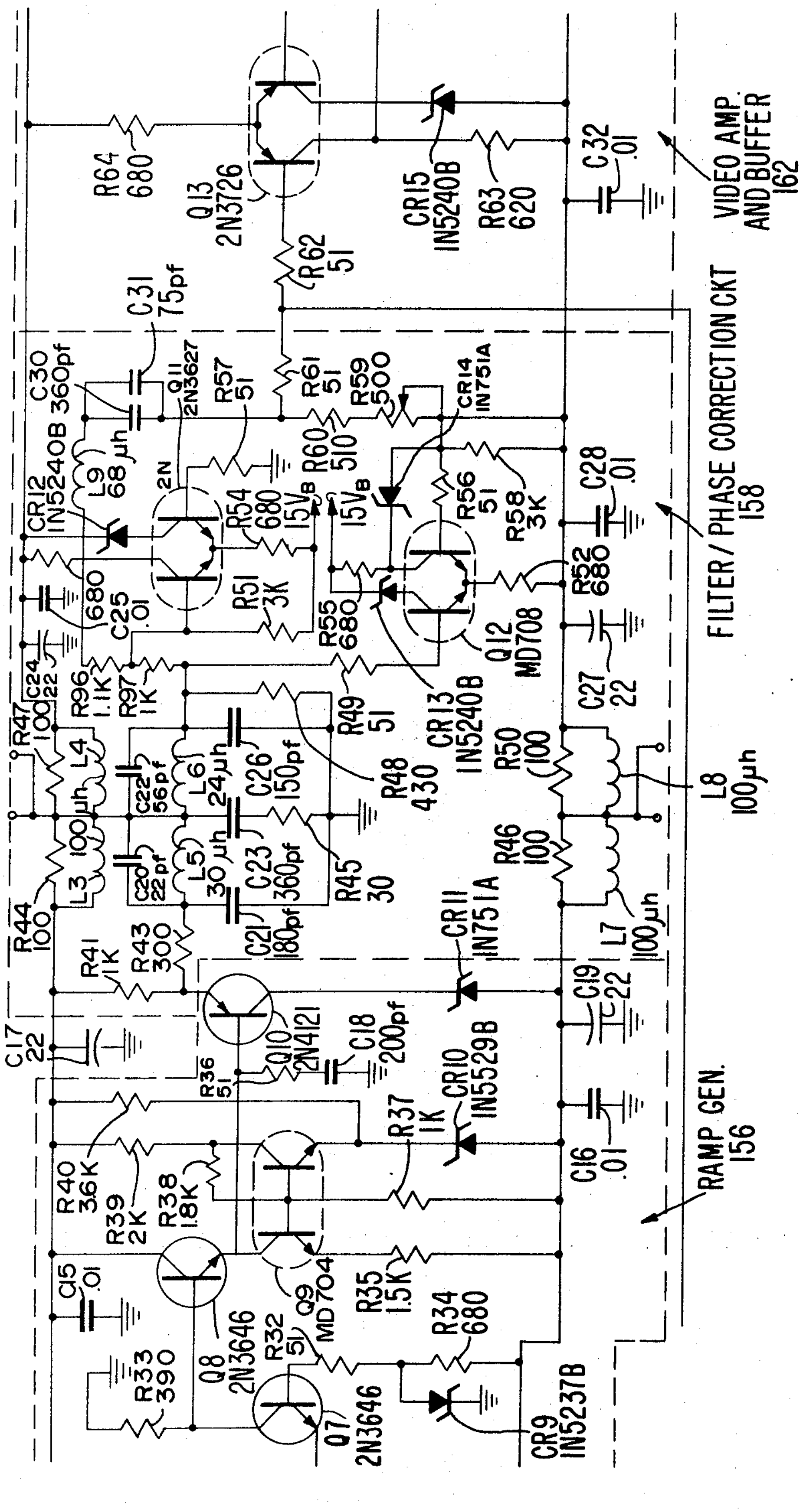
Figure 13C:
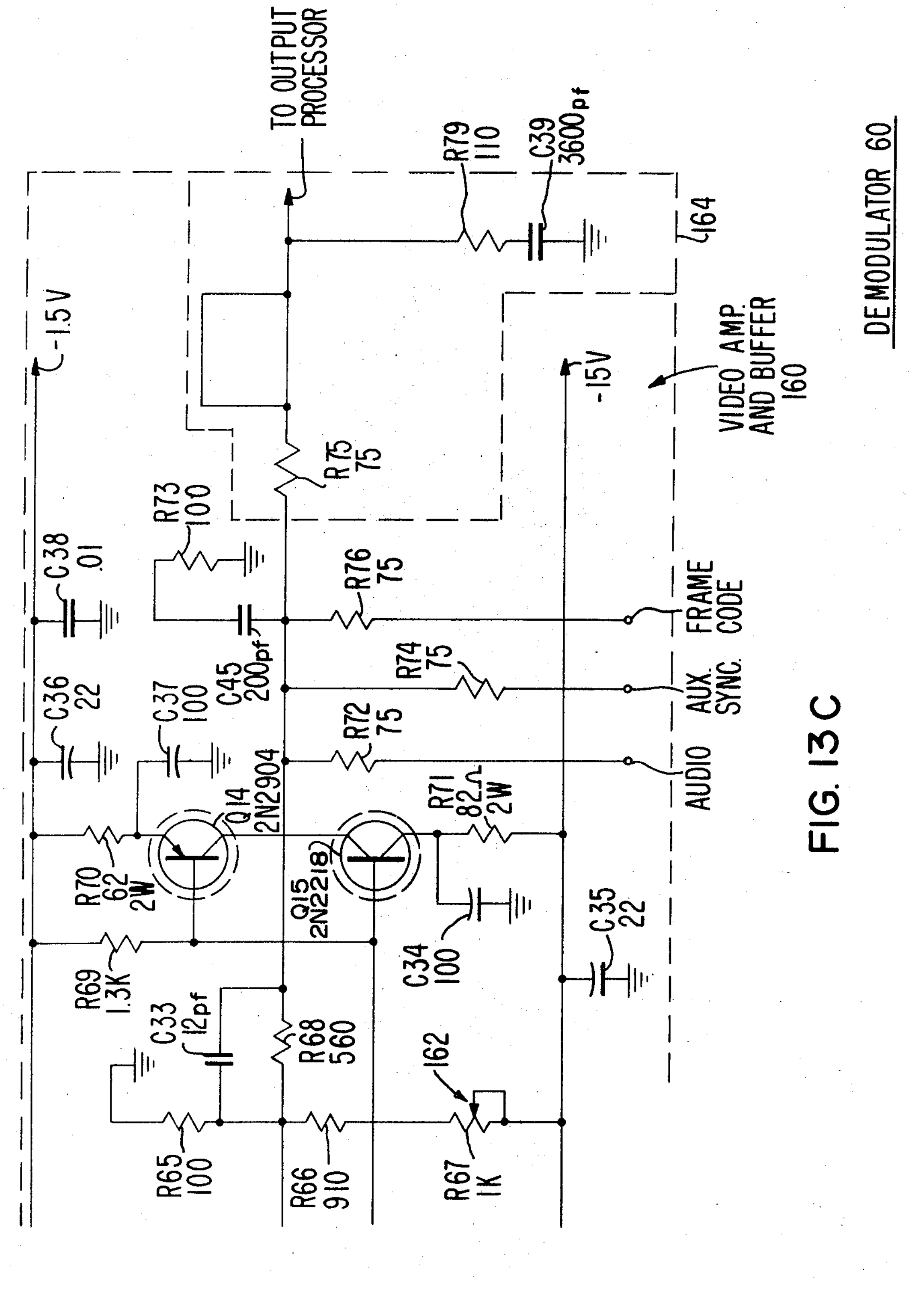

Details of the modulator circuit 42 are shown in FIGS. 11A, 11B and 12. The video output from the input processor circuit 38, stripped of sync pulses and having undergone noise reduction in the noise reduction circuit 46, enters the modulator 42 through an input buffer amplifier 110. A clamp/D.C. restore circuit 112 keeps the blanked portion of the video signal at ground in order to maintain a constant D.C. reference base.

After passing through a clamp/buffer amplifier 114, the operation of which will be described subsequently, the video signal is first passed through white clipping circuit 120. Thereafter the modified sync pulses, having a 2 microseconds width, are added during the blanked portion of the signal through the sync input circuit 116. As described earlier, the modified sync pulses are narrower in width than the normal sync pulses used in television pictures. They are also timed to occur earlier during the blanking period so as to provide a longer effective backporch for insertion of the audio signals.

The video, with the modified sync pulses inserted in the blanking interval then pass through video amplifier 118. The video amplifier provides nominal gain and also inverts the signal. Most importantly, however, video amplifier 118 provides additional gain to the high frequencies, i.e., provides preemphasis to the high frequencies.

First and second white clipping circuits 120 and 122 control the maximum level of signals through the modulator. In particular, the second clipping circuit 122 controls the preemphasis spike level. The clipping level of clipping circuit 122 is determined by the setting of potentiometer R12.

The frame code, address signals are introduced into the vertical intervals through frame code input circuit 121. As explained above, a unique address code is provided for each video frame of information.

PAM audio samples from audio record circuit 36 are inserted on the backporch of the blanking interval, in a manner as explained above, through audio insertion amplifier 128. Adjustable gain is provided by potentiometer R38. The video signal with the modified sync and audio signals which results is illustrated.

The remaining portion of the modulator circuit converts the audio and frame coded video signals into RF, pulse interval modulated (PIM) output signals. In general the pulse interval P.I., of PIM output pulses is given by the relationship $$\text{P.I.} = 1/f \tag{1}$$

A buffer amplifier circuit 130 alters the analog video signals into a series of pulses as shown. These pulses have the following characteristics: (1) The pulse width varies proportionally with the amplitude of the incoming signals; and (2) the pulse height varies with the amplitude of the incoming video signals.

A pulse-interval generator 132, utilizing an emitter coupled current mode, provides the final PIM output signals which go into the system record distribution and delay circuits 70, via the noise reduction circuits 68. The PIM output signals are of a constant amplitude. The higher the voltage inputed to generator 132, the longer the pulse width therefrom.

A symmetry control 134, comprising a potentiometer R63 is adjustable for minimum 2nd harmonics. Capacitors C19 and C20 determine the sample rate of the VCO 132. According to sampling theory, the sampling rate must always exceed twice the maximum frequency through the system. It is for the latter reason that clipping circuits 120 and 122 are utilized.

DEMODULATOR 60

Referring to FIGS. 13A, 13B, and 13C and FIG. 14 the RF video from the disc packs 50 enters the demodulator 60 through pin 51 into amplifier/limiter circuit 150. Sufficient gain is provided, i.e., approximately 60 db, to drive limiter circuit 150 into saturation, thereby squaring the incoming composite RF signals. The reason that this is required is that while square PIM signals are recorded in the disc packs, the output from the disc packs is more nearly a sine wave than a square wave. A balance control 152, comprising potentiometer R7 is used to adjust for minimum carrier feed through.

From the amplifier/limiter 150 the squared-up RF video signals goes to a frequency doubler circuit 154 which provides a pulse train at half the incoming pulse-interval. The reason the interval is halved is to more effectively eliminate the pulses whose rates fall within pass band of the output filter.

The output from the doubler 154 goes to a ramp generator 156 which provides a sawtooth output equal in duration to half of the RF signals. The amplitude therefrom is controlled by the pulse duration of the signal inputed to the ramp generator 156.

The carrier is removed in the filter/phase correction circuit 158. The output from the filter 158 comprises demodulated video signals which are the average value of the ramp.

From the filter circuit 158 the demodulated signals go through a video amplifier and buffer 160 having a gain of approximately 6. D.C. level adjustments are made by control 162 comprising a variable potentiometer R67.

The output from the video amplifier 160 goes through a de-emphasis network 164 before going onto the output processors. The purpose of this is to get rid of transients which would effect the TV screen viewing.

Other outputs are taken from the video amplifier circuit 160 before the demodulated video signals go through block 164. These outputs are unemphasized composite video and must be processed further to obtain the required signal, i.e., sync, etc.

A mute circuit 166 provides a constant dark gray TV picture if, for some reason, information from the disc pack suddenly fails to be received at the de-modulator. Without this circuit, in the event of such a drop out, the screen would have a kaleidoscopic appearance which makes viewing very uncomfortable.

If the input signal to amplifier 150 drops below a level selected by level adjust 168, potentiometer R81, integrating capacitor C41, fed through amplifier 170, will charge to a value greater than the threshold level set on Schmitt trigger 172. This in turn clamps the input of the video amplifier 160 to a dark gray level.

AUDIO PROCESSOR CIRCUITS

Figure 15A:
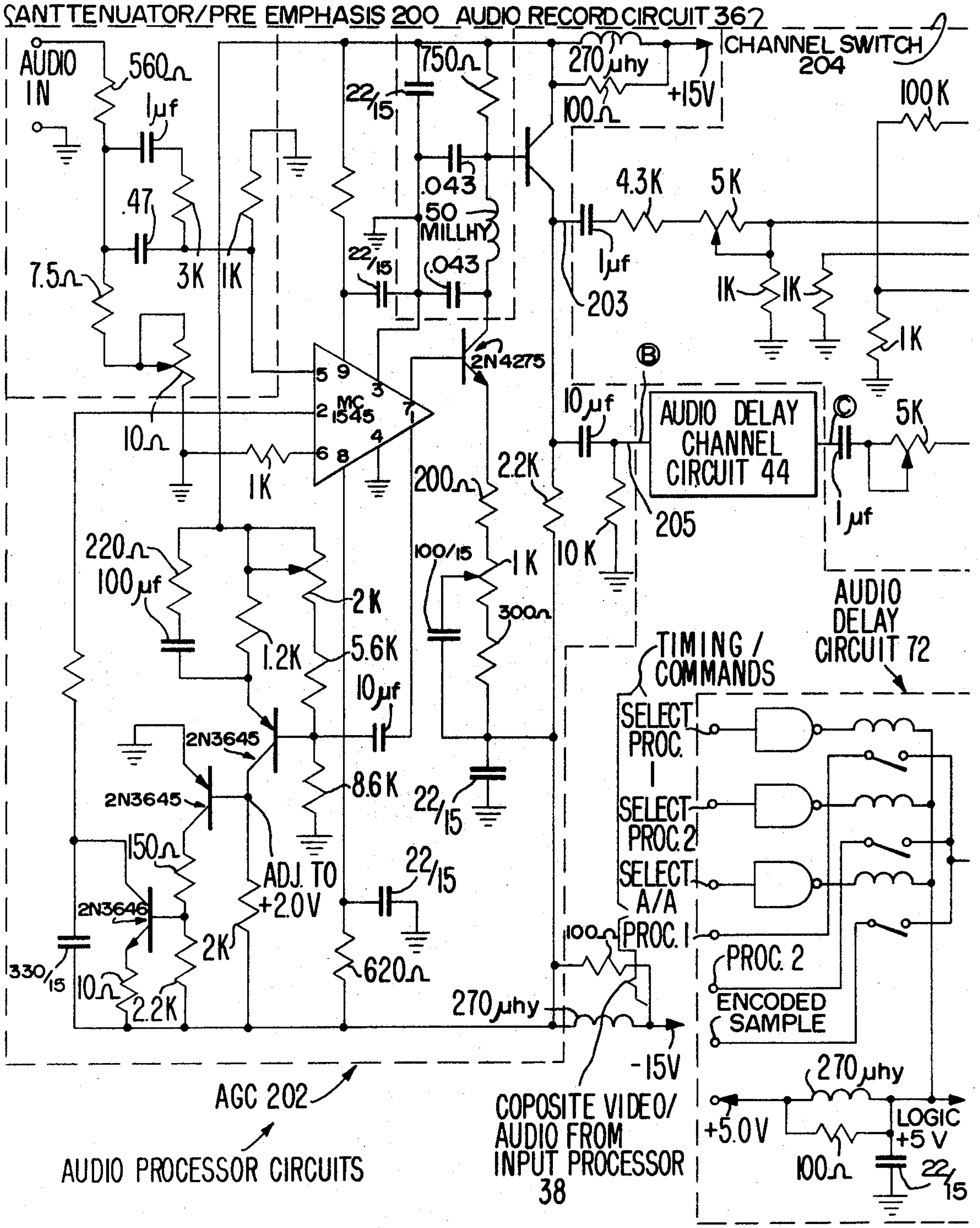
FIGS. 15A and 15B and 16 illustrate in greater detail the audio processor circuits of FIG. 2A and 2B.
Figure 15B:
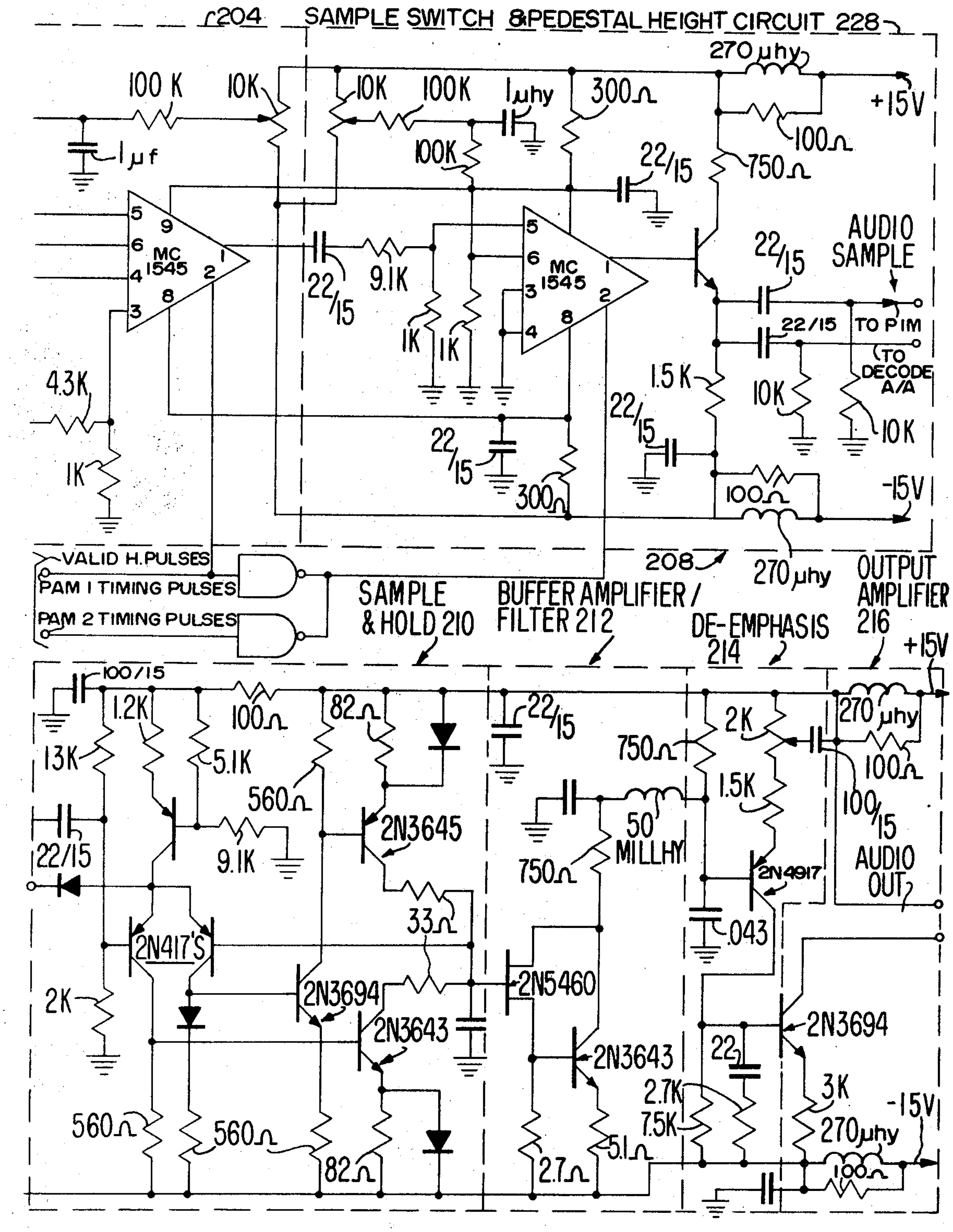

Details of the audio record circuit 36 are shown in FIGS. 15A and 15B. The audio signal comes into an attenuator and preemphasis circuit 200. It reduces the 600 ohm line to a level that is compatible with an AGC (automatic gain control) circuit 202. Since preemphasis is added to the audio signals at this point, if a high frequency signal which is preemphasized reaches the level that would saturate the modulator the AGC circuit 202 automatically reduces it. If the preemphasis was made after the AGC circuit 202 high frequency, high level signals could get through an over-modulation could occur. The purpose of the AGC circuit 202 is to avoid over-modulation. This circuit is set to provide a 1 volt peak-to-peak output. If the input increases beyond that which would produce 1 volt peak-to-peak output it lowers the gain holding closely to the 1 volt output.

The output of the AGC circuit 202 has two paths, a direct path 203 to a channel switch circuit 204 and a second path 205 through the skipfield audio circuit 44 which is for skipfield operation and which will be described subsequently. Both paths come into the channel switch 204 which, when required, switches between either the direct path 203 or the delayed path 205 as described in connection with FIG. 5. Channel switch 204 has gain control for each path and a DC balance such that the output of switch circuit 204 is always at the same DC and AC levels for both paths 203 and 205.

The output of the channel switch 204 goes to a sample switch and pedestal height control circuit (encoder) 208 which samples the audio at line rate with 4 microsecond pulses. The combination of the channel switch 204 and circuit 208 form the audio encoder circuit 412 described generally with respect to FIG. 5. Line rate refers to the approximate 63.5 microseconds per video scan line. Thus 4 microseconds of audio are sampled out of every 63.5 microseconds of actual audio. The same switch 208 also contains provision for pedestal height (voltage) control on which the audio is placed. The sample on its pedestal is then fed to the pulse interval modulator 42 and combined with the rest of the composite video. The pedestal height would normally be set at 50 percent IRE or gray level.

A second output from the sample switch is used for A/A, or audio-to-audio, testing without the skipfield disc 404. A switch in the decode section picks this output up.

Timing signals come from the audio timing (not shown) called PAM1 and PAM2. PAM 1 signals accomplish two things. PAM 2 signals cause the channel switch 204 to select the straight through audio path and commands the sample switch 208 to take an audio sample. When a PAM 2 signal arrives, sample switch 204 is not activated and is therefore in the delayed position so that the sample is taken from the delayed audio channel 44. In other words, encoder switch 208 acts like a multiplexer to switch between and combine delayed and non-delayed PAM audio samples.

Details of the audio play circuit 72 are also shown in FIGS. 15A and 15B. A sample and hold circuit 210 operates during the playback mode of operation. A sample command pulse — a 2 microsecond pulse — is inputed to the sample and hold circuit 210. It is centered in the middle of the 4 microsecond audio PAM pulse and commands the sample and hold circuit 210 to take a sample in the middle of this audio pulse (which is, as previously described, located on the backporch of the composite video signal). The sample and hold circuit 210 takes a sample every time it is commanded which is once every 63.5 microseconds, and holds that value until it receives the next sample pulse. The sample and hold circuit 210 continues to hold the last sample of audio. The reason this is done is in case for some reason an audio sample is not received, for example, when it does not get a "Valid H" signal. Rather than having the audio signal drop down to zero, it repeats the last sample until it gets the next valid sample. This gives a much better approximation of the actual audio signal than would be achieved if the signal drops to zero. The audio signal then goes to a buffer amplifier and a 5 KHz filter circuit 212, and then to a deemphasis circuit 214 and an output amplifier circuit 216 which provides the decoded audio output.

There are times we want the audio to be from channel 1 processor, sometimes from channel 2 processor. By energizing the appropriate switch by the respective input select commands, either processor 1 or processor 2 can be selected. Thus as described above, an A/A switch can be actuated which takes the sample from the second output of sample switch 208 and bypasses the skipfield discs for audio testing purposes.

It should be understood that both the play and record modes for the audio signals require that precise timing schedules be met in order to open the proper "windows" for the audio. A "Valid H" circuit, forming a part of the sync circuits and described subsequently, insures that the horizontal sync pulses used in timing the audio windows occur at the correct times. It is these Valid H sync pulses which are inputed to both the audio record and play circuits described above for timing purposes.

Figure 16:
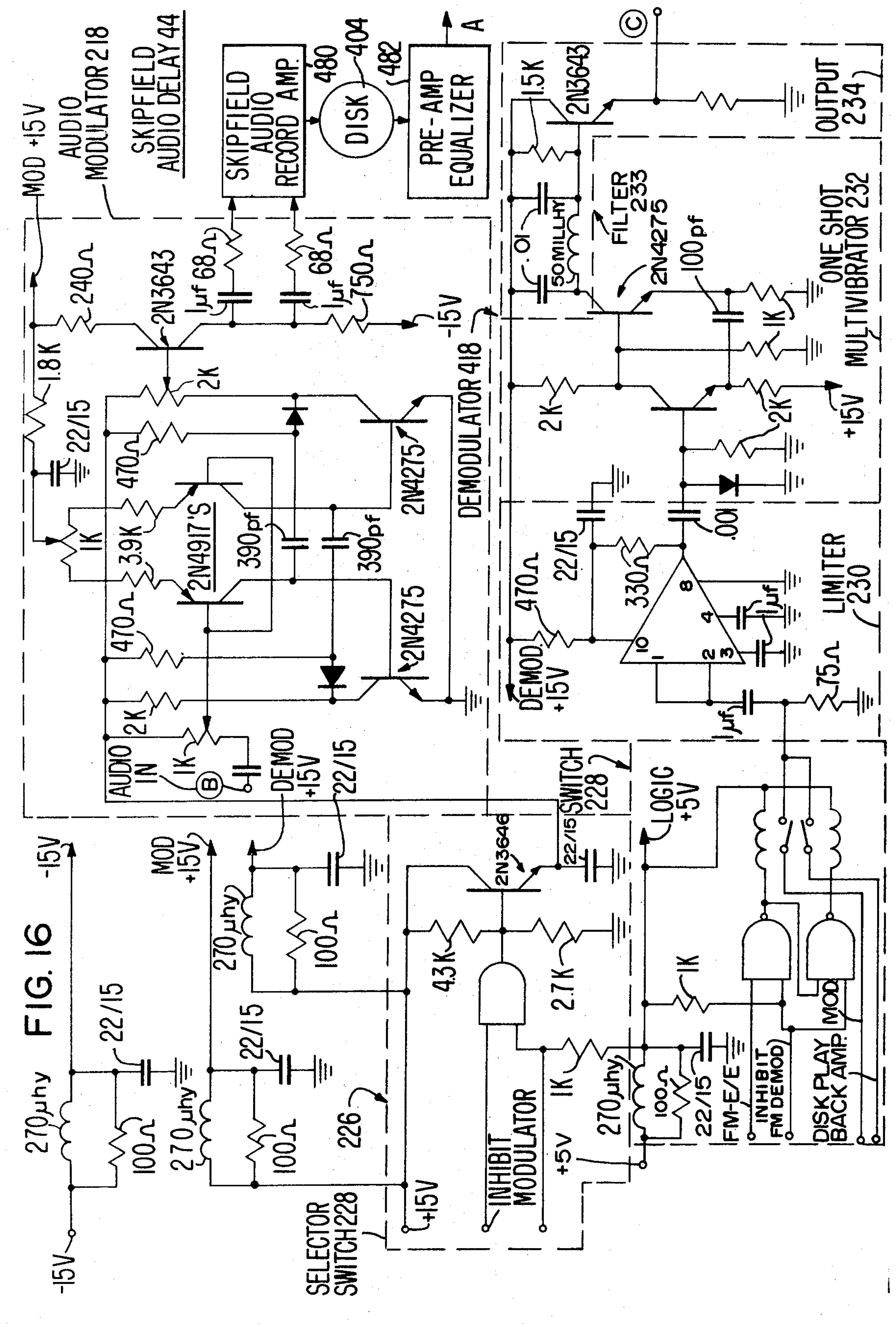
Figure 17A:
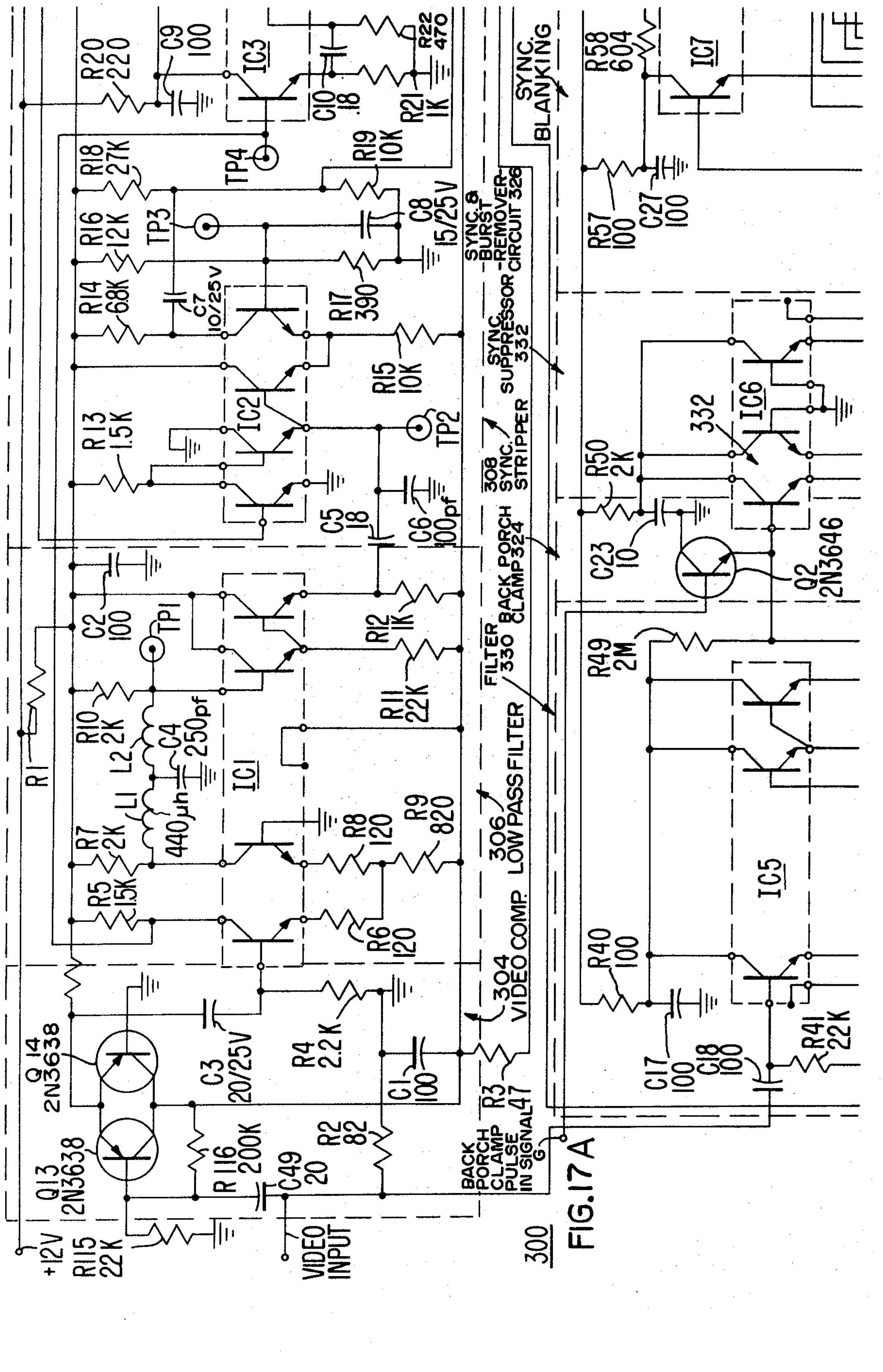
FIG. 17A–17D illustrates in greater detail the input processor circuits of FIG. 2A and 2B.
Figure 17B:
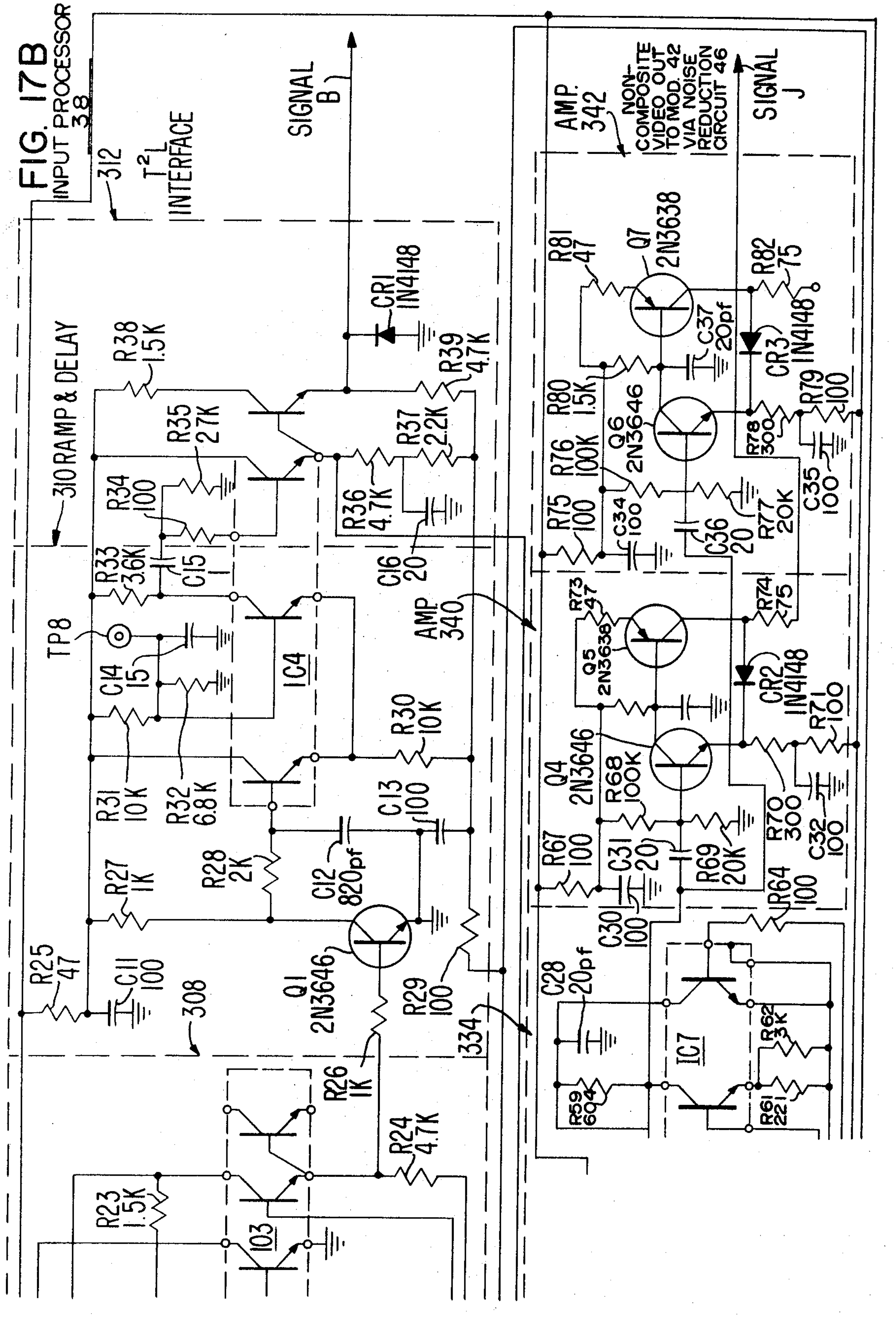
Figure 17C:
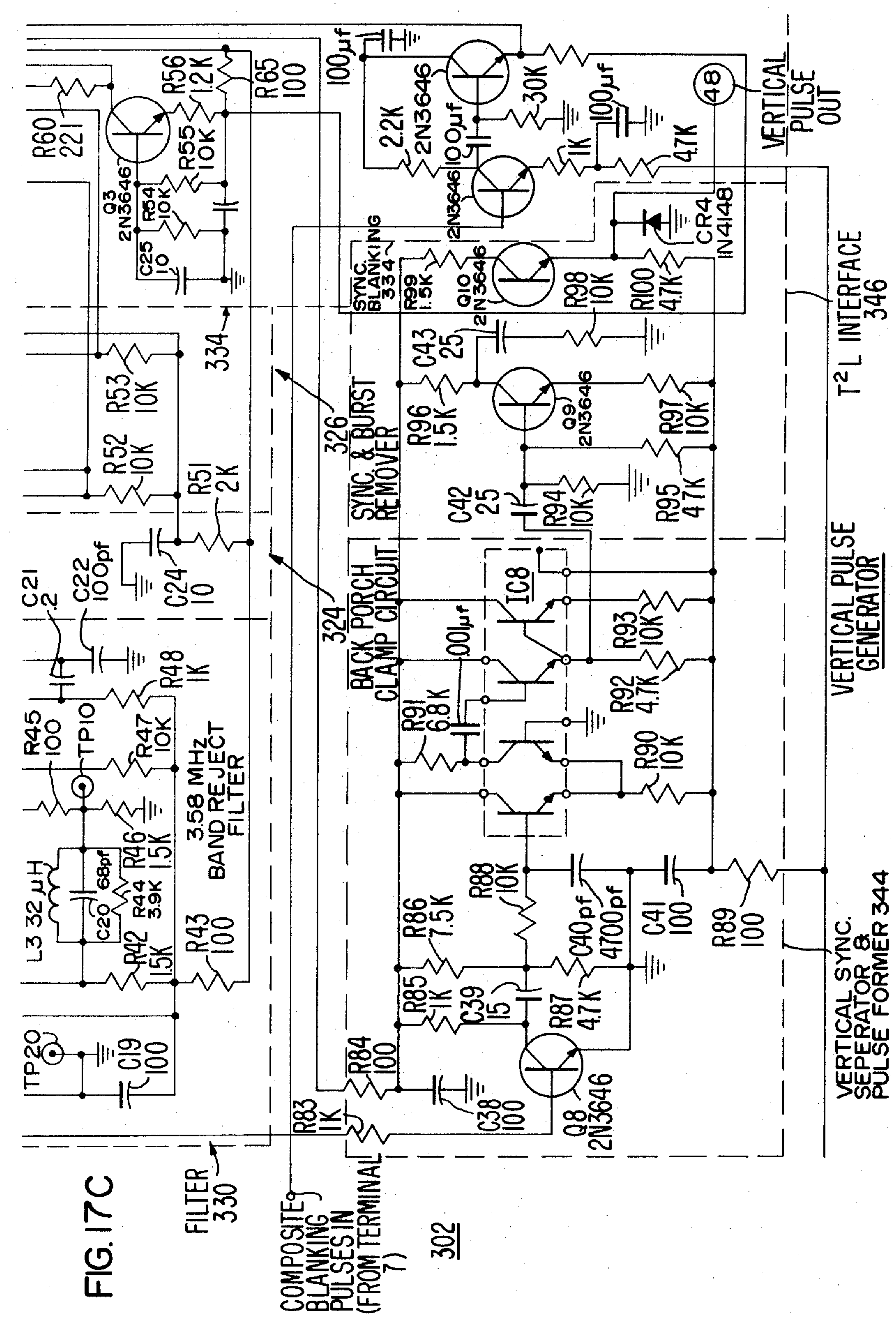
Figure 17D:
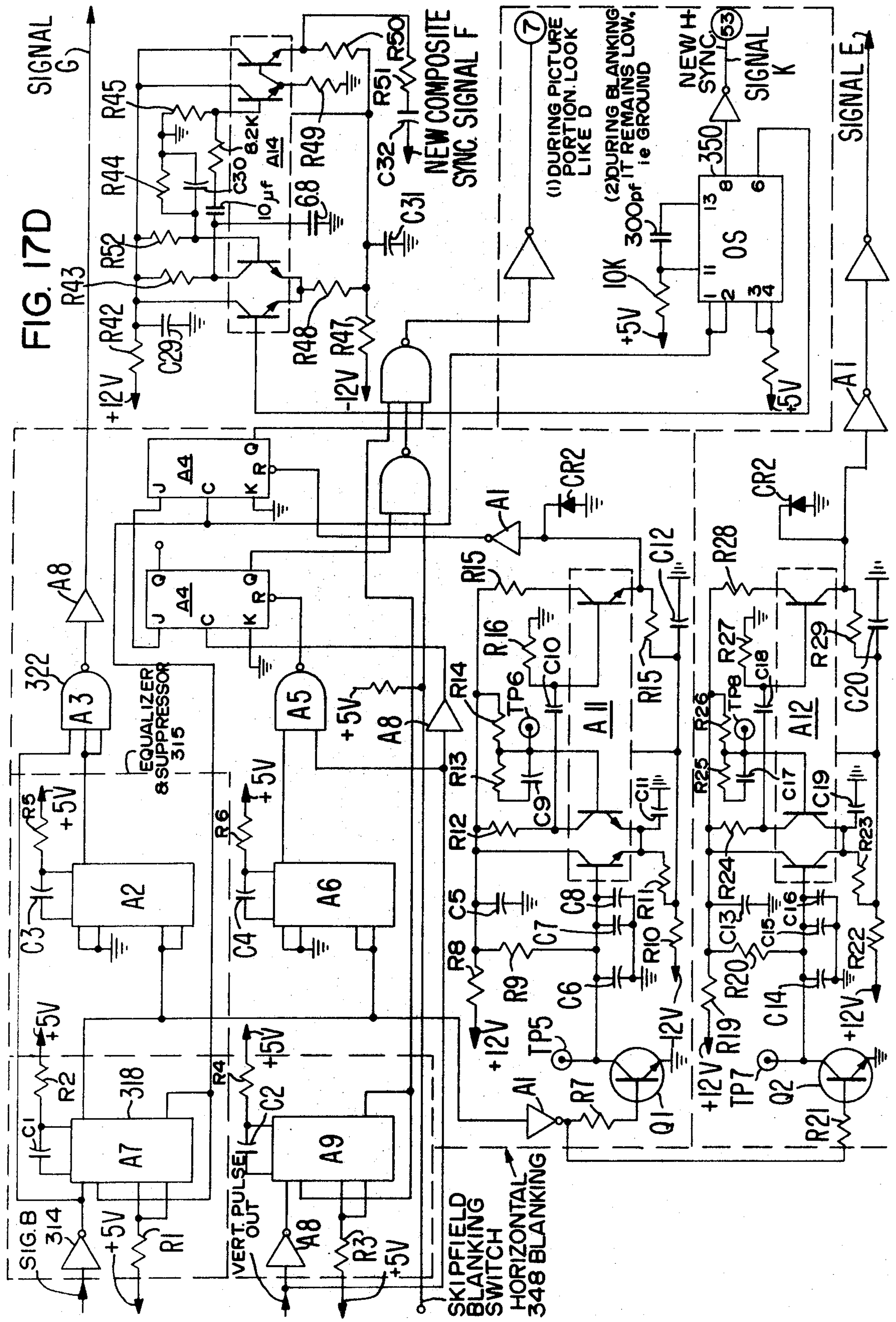

Details of the skipfield audio delay 44, also described generally with respect to FIG. 5 are shown in FIG. 16. The audio signals from the AGC circuit 202 enter at the input designated B of the delay channel 44. The audio signals are inputed into the audio modulator 14 which will operate between about 250 and 500 kilohertz. Modulator 410 includes a voltage controlled oscillator which has a buffered output, which is sent along two paths. One RF output goes to the skipfield audio record amplifier 480, the skipfield recorder 404, a preamp equalizer circuit 482, and finally to the audio demodulator circuit 418.

The second output is used for E/E testing of the delayed audio modulator/demodulator. It goes straight into the demodulator 60 and test without the skipfield disc. E/E is the nomenclature for electronics to electronics, with the skipfield disc media left out. The E/E switch includes a regulated 5 volts supply circuit 226 with a logical input level inhibit. For skip field operation alternate fields from the disc have no information, only noise. During these fields the system is switched E/E in order to provide a constant D.C. out of the demodulator 418 and avoid transient recovery problems.

Selector switch 228 selects the modulator output for E/E testing or selects the disc playback amplifier to feed one or the other to the modulator 410. It also has an inhibit input which prevents any input at all from reaching the demodulator 418.

The output from the E/E switch 228 goes to the demodulator 418 which consists of a limiter 230 which drives a one shot emitter coupled multivibrator 232. The main function of the limiter 230 is to take the output from the disc playback preamplifier and "square it up" to overcome noise and amplitude variations so that the frequency modulation content can be removed. Limiter 230 limits on several hundred microvolts and can take inputs to ± 3 volts. The result is that as the input amplitude varies, for example, over a range of 10 or 20 dB , the output remains a strong consistent square wave. The one-shot multivibrator 232, emitter coupled, provides a constant width pulse. The average of the current in the collector of its second transistor $Q_2$ represents the original audio. This is fed to a 10KHz filter 233 to remove the carrier frequency and it is then applied to an emitter-follower output 234. The delayed audio output, designated C, then goes on to the encoder circuit of FIG. 15.

INPUT PROCESSOR CIRCUIT

The purpose of the input processor circuit 38 is to take the timing signals i.e., the sync signals, from the video and to reprocess them, to remove their noise content and to reposition them for better performance as needed by the system. The input processor 38 narrows the width of sync from a nominal 5 microseconds to 2 microseconds and repositions it so that there is an extended width "backporch" where the audio PAM pulses are placed in the modulator.

Input processing circuit 38 is shown in greater detail in FIGS. 17A–D. It includes two general signal processing areas, a pulse processing circuit 300 and a video amplifier 302. Video information signals from a video tape playback unit enter the input processor and are divided into two paths one path goes to a video compressor circuit 304. The video compressor 304 is a circuit which non-linearly compresses the video portion of the incoming signals while keeping the gain for the sync portions linear. This allows the subsequent circuits within the input processing circuit 38 to have a better ability to discriminate between the video and sync portions of the incoming signals. Compressor circuit 304 insures that even if there are wide excursions of the video signal it does not interfere with the sync portion of the signal.

From there the signals pass through a low pass filter 306. The low pass filter 306 provides the security against high frequency noise spikes coming through from the outside signal sources. It takes narrow spikes and lowers their energy while leaving the energy present in the sync pulses themselves and allows them to pass through almost unchanged.

After passing through the low pass filter 306 the signals go through a sync stripper circuit 308. Here the horizontal sync pulses are stripped from the video portion.

Figure 18:
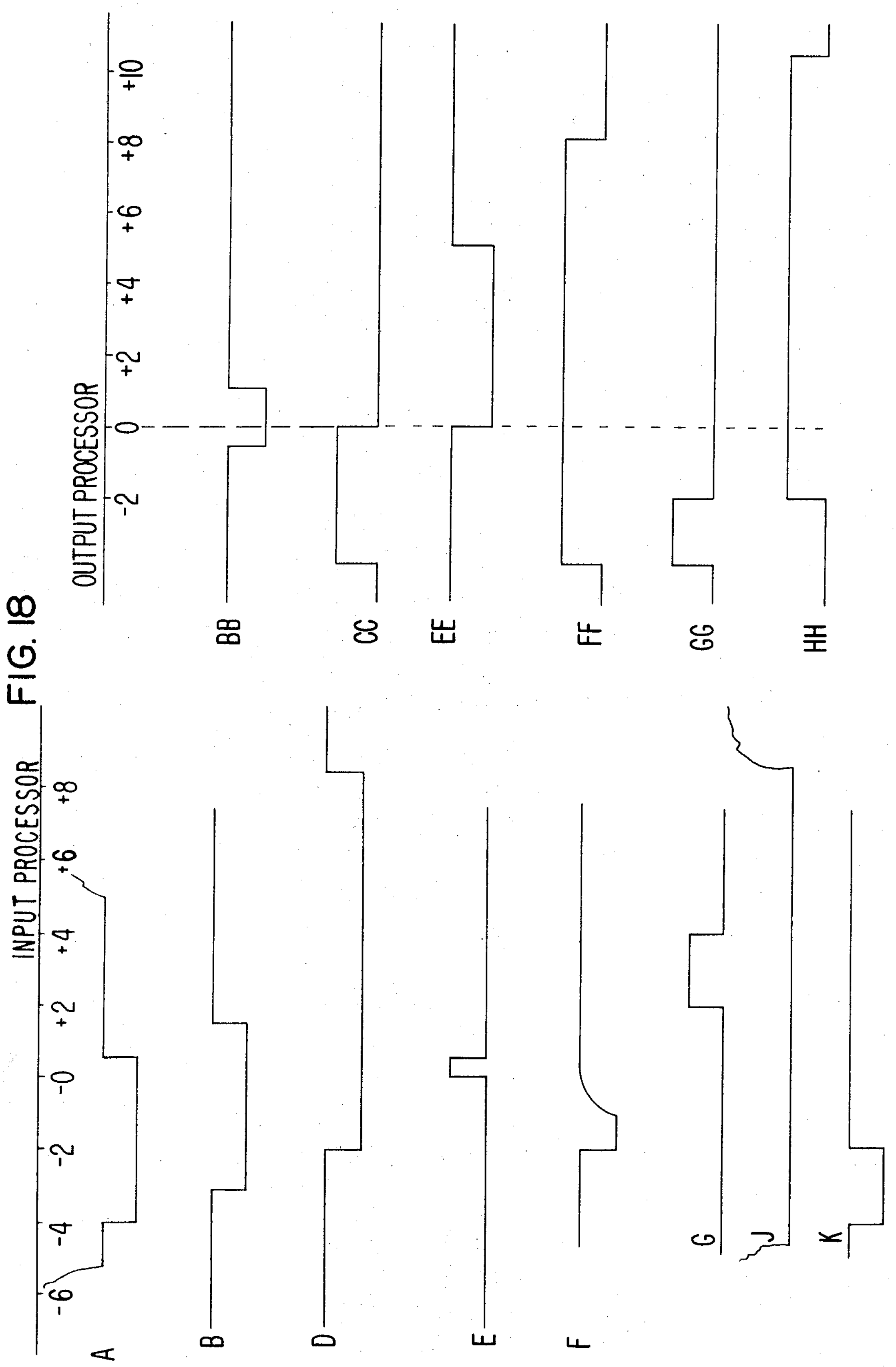
FIG. 18 illustrates waveforms generated within the circuits of FIGS. 17A–17D and 19A and 19B.

Once through the sync stripper 308, the signal goes to ramp and delay circuit 310. The ramp and delay circuit 310 causes the length of time of the sync to be normalized to a two microsecond overall delay from the input for purposes of timing. It produces a ramp which is timed such that the pick off point is at 2 microseconds delay. The signal goes through a $T^2L$ interface output circuit 312 which provides a plus 2½ volt, minus seven-tenths of a volt swing on the output. $T^2L$ is the nomenclature that is used in the industry for a particular type of digital logic circuitry which uses transistors only. $T^2L$ interface provides signals which are suitable in impedance and more importantly power level to insure the operation of the subsequent $T^2L$ logic circuitry. The signal which remains is stripped composite sync and is illustrated as signal B in FIG. 18. (The following discussion includes reference to various waveforms, all of which appear in FIG. 18).

The burst referred to is the color burst from color television signals.

Stripped composite sync signal B goes through an inverter 314 and then goes to an equalizer suppressor circuit 315 comprising a one shot multivibrator 318. The one shot multivibrator 318 suppresses the vertical interval equalizer pulses which are not in sync with the horizontal sync pulses. In effect it eliminates every other equalizing pulse. Were it not for this, the circuit would do two things: (1) it would clamp the video during the middle of an active line and (2) it would also put out an audio pulse to sample where there was no audio present producing twice as many samples as was needed or desired during the vertical interval. The signal is then clamped by a backporch clamp circuit 320, and after passing through clamp inhibit gate 322, to form a backporch clamp pulse, is routed to the backporch clamp circuit 324 which forms a part of sync and burst remover circuit. The backporch clamp circuit 324 clamps the video signals during the non-video portion thereof. The signal then goes to a sync compressor 332 which reduces the amplitude of sync such that blanking circuit 334 has less sync amplitude to remove from the composite video. The composite blanking signal D from terminal 7 which is derived from horizontal blanking circuit 348 comes into a blanking switch circuit 334. This circuit takes the compressed sync from the video, deletes it and replaces it with a straight line, i.e., a constant voltage at or near ground. The resulting signal, i.e., signal J is a video signal without sync which is sent into the modulator, after passing through output amplifier circuit 340.

Vertical pulses utilized by the circuits which provide the backporch clamp pulse (signal G) are derived from the input video signals by sending the input video through a vertical sync separator and pulse former circuit 344 and $T^2L$ interface circuit 346.

The new H sync pulses are provided at output terminal 53. These signals are derived by sending the output from the equalizer supressor circuit 315 through a new horizontal sync circuit.

OUTPUT PROCESSOR CIRCUIT

Figure 19A:
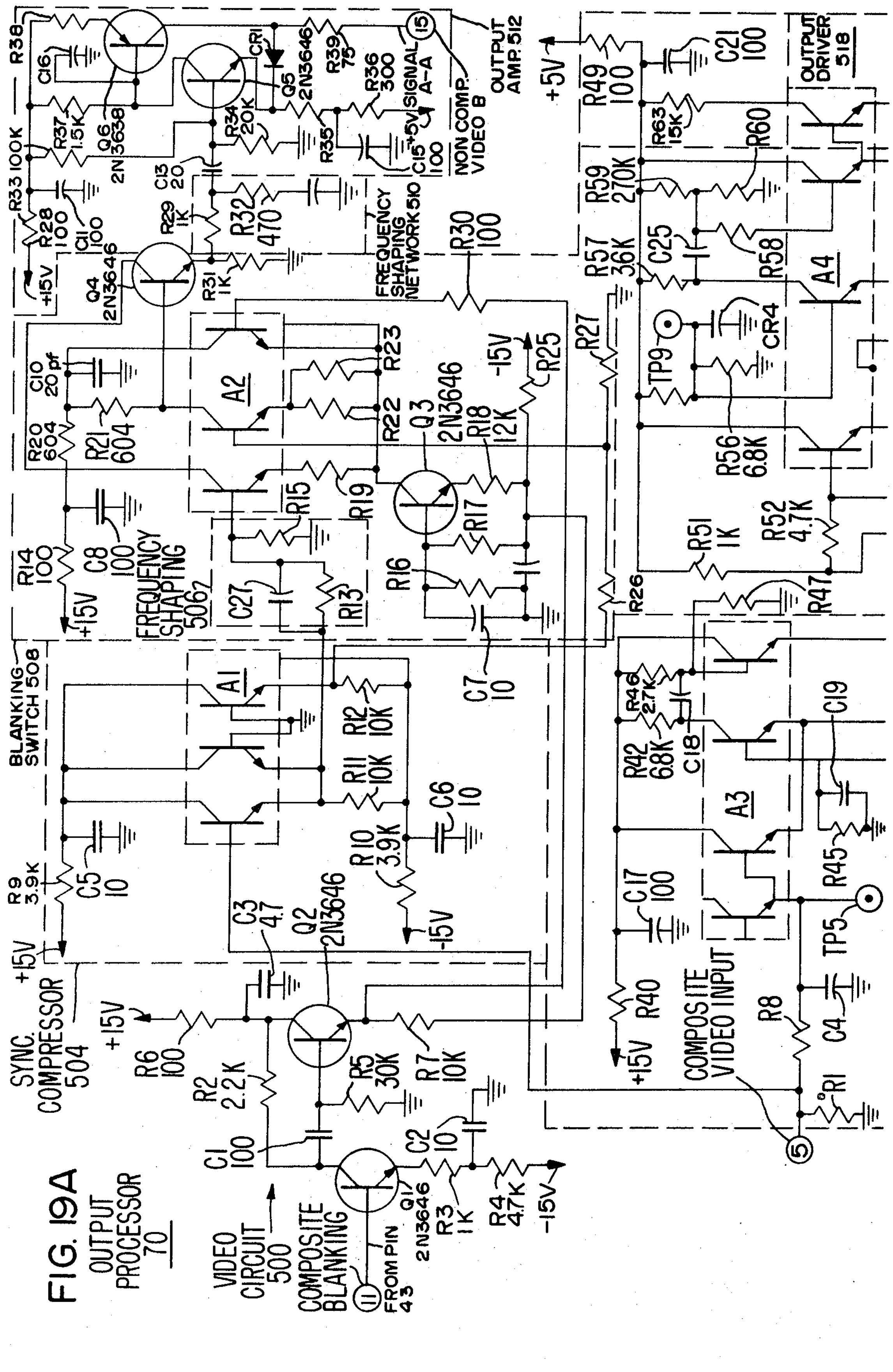
FIG. 19 illustrates in greater detail the output processor circuit of FIG. 2A and 2B.
Figure 19B:
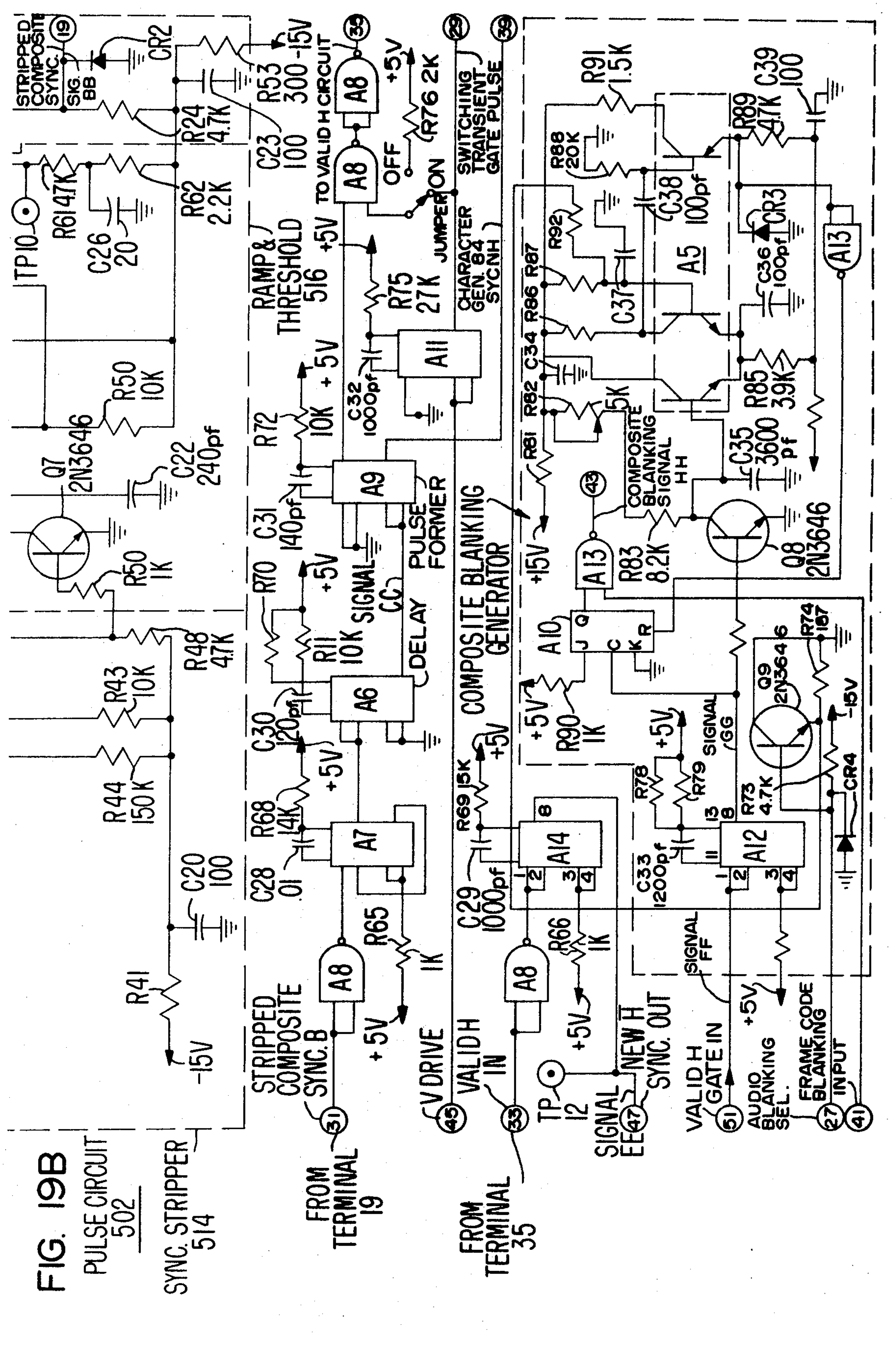

Details of the output process circuit 70 are shown in FIGS. 19A and 19B. The input video comes in on pin 5. It splits up and on one route it goes to the video circuit portion 500, and the other path is to the pulse circuit 502 which constitutes basically the lower two-thirds of the circuit. The path that goes to the video circuit 500 goes first to a sync compressor 504, which serves the same function as the sync compressor in the input process circuit 38. From the output of the sync compressor 504 the signal goes through a frequency shaping circuit 506 which puts the audio PAM pulses back to their original rectangular form. This circuit then feeds the blanking switch 508. It has an amplifier very similar to the amplifier on the input processor 38 and the blanking switch 508 is identical otherwise to the input blanking switch circuit.

The output of the blanking switch circuit 508 feeds another frequency shaping network 510, which is complimentary in frequency response to the first. This circuit then feeds the output amplifier 512 which feeds noncomposite video to the noise reduction circuit or the output video switch-fader 82.

The second path goes through a low pass filter and into a sync stripper circuit 514. This circuit removes the video from the sync and leaves behind only a switched waveform representing the sync that was present in the input composite video. This circuit feeds a ramp and threshold circuit 516 which determines whether a negative-going pulse is longer than approximately 1½ microseconds (the sync is 2 microseconds long and therefore any noise pulses coming in that are shorter than 1½ microseconds are discriminated against). The output of this circuit is fed into an output driver 518 which is compatible with the subsequent $T^2L$ logic circuitry.

Pin 19 is connected with pin 31, the strip composite sync input. It is fed through an inverter A8 into a one-shot multivibrator A7 whose duration is approximately 50 microseconds. The stretched pulse is then fed into a delay one-shot multivibrator A6 which trims the overall delay of the circuit to be equal to 2 microseconds from input video sync to this point. This normalized delayed sync then is fed into a half-microsecond one-shot multivibrator A9. This signal is sent out through gates to "Valid H" circuit and the digital side of the system and to pin 33.

The signal fed to pin 33 is inverted by A8, fed into a one-shot multivibrator A14 whose pulse width is 5 microseconds and the new $\overline{H}$ sync output is fed to the switcher-fader 82 for adding to the video. This sync is noncomposite sync; it is purely the horizontal sync pulse with no vertical. The picture content is the same as it would have been normally but without the vertical.

The "Valid H" circuit (FIG. 23) is described elsewhere in the present application in connection with audio processing. The "Valid H" circuit is used by the audio circuits to determine whether this new sync pulse is within narrow timing tolerances of being in the proper place of 63½ microseconds from the last one. That is to say, there would be, for example, a 16 microsecond wide gate delayed by 55½ microseconds from the previous sync.

Fed in from the Valid H where Valid H circuit 650 (FIG. 23) is derived is the signal that is the start of the gate for Valid H. It is called Valid H gate input. It comes in on pin 51, and precedes the sync pulse by approximately 8 microseconds because that is the width of the gate preceding it. That is, it is digitally clocked to be 8 microseconds preceding the sync pulse. It goes through a one-shot A12 to delay the signal timing to be approximately 2½ microseconds prior to the new sync H pulse. The output of the one-shot A12 is fed into another ramp delay circuit whose period is approximately 13 microseconds starting at −2½ microseconds and extending to +10.5 microseconds relative to the original sync timing. The A12 one-shot sets A10 which is a flip-flop. The output of the second pulse delay resets flip-flop A10. The output of flip-flop A10 is gated at A13 with frame code blanking input derived from the output switcher-fader coming in on pin 41. The output sent out is composite blanking. Composite blanking output pin 43 comes back into this board on pin 11.

The input of pin 27 assures that the second audio PAM pulse is not blanked out during each horizontal line, thereby allowing the video editor to see the audio as a variable density stripe at the left edge of the picture as well as hear it during each frame while jogging frame by frame in the system. V-drive comes in on pin 45 and is sent into a one-shot A11. Its purpose is to provide a pulse to suppress the switching transients caused by switching from head to head within the drives. The output is sent out on pin 29 as a switching transient gate pulse. The composite sync and the noncomposite video is fed eventually into the video switch/fader 82. There the noncomposite sync is added to the video. As previously described the video may be mixed in any ratio to a sum value of unity. This unit also provides the industrial sync addition to the video. It puts a three line long negative pulse in the sync at approximately the vertical timing.

CLOCK 91

Figure 20:
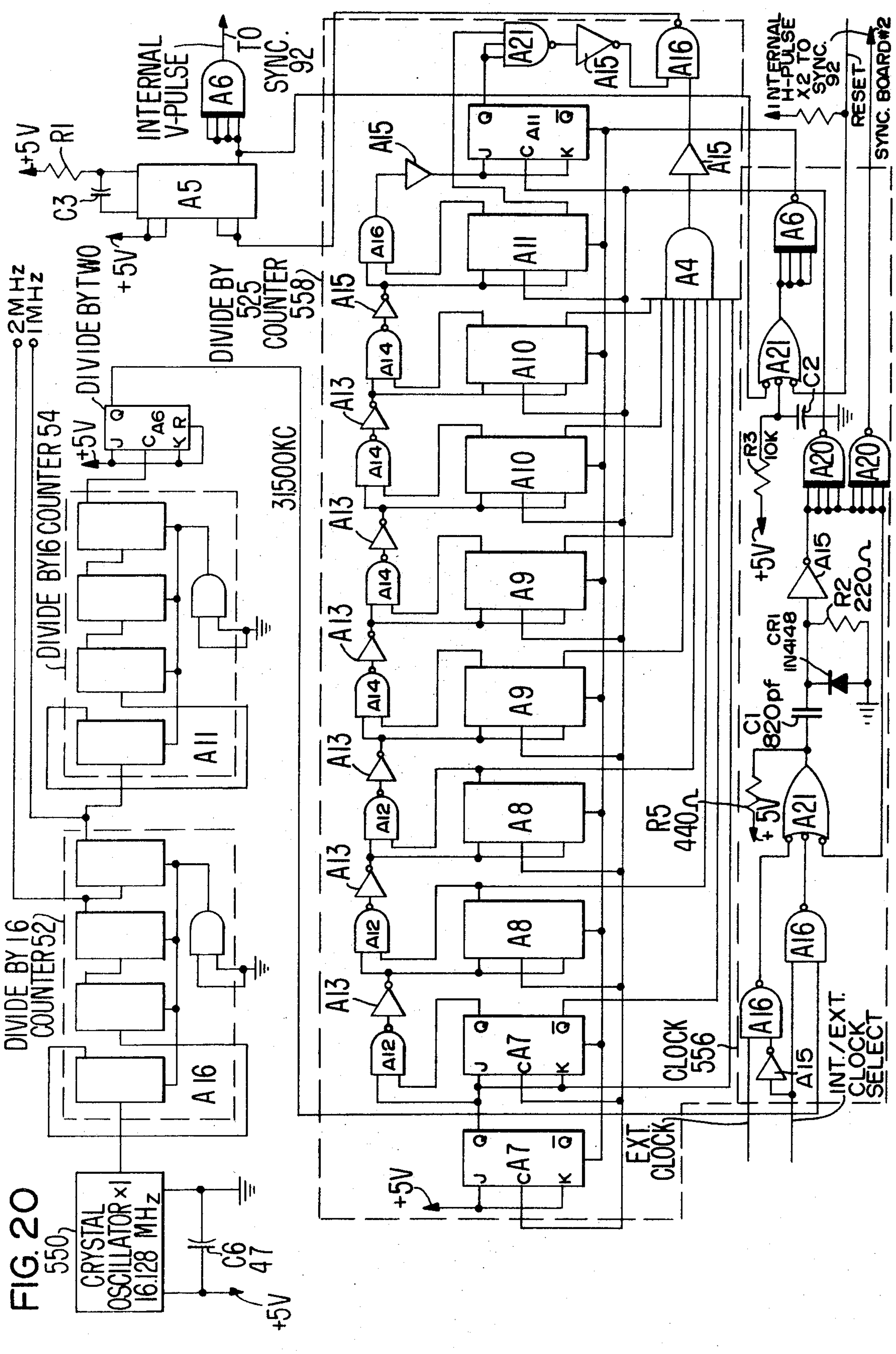
FIG. 20 illustrates in greater detail the clock circuit of FIG. 2A and 2B.

Details of clock 91 are shown in FIG. 20. As explained, clock 91 provides the internal V and H pulses or drives.

A 16,128 KHz crystal oscillator 550 is counted down by two divide-by-16 circuits, 552 and 554 and a divide-by-2 flip-flop A6 which provides a 31.5 KHz clock. Output leads from the divide-by-16 circuit 552 additionally provide 1 MHz and 2 MHz pulse trains for use by other parts of the system.

From flip-flop A6 the resulting pulse train, now divided down by 512, is sent to a clock circuit 556 which is used to clock a divide-by-525 synchronous counter 558 which generates the internal V-pulses used by sync circuit 92. The horizontal sync pulses are outputed from the clock circuit 556.

SYNC CIRCUIT 92

Figure 21:
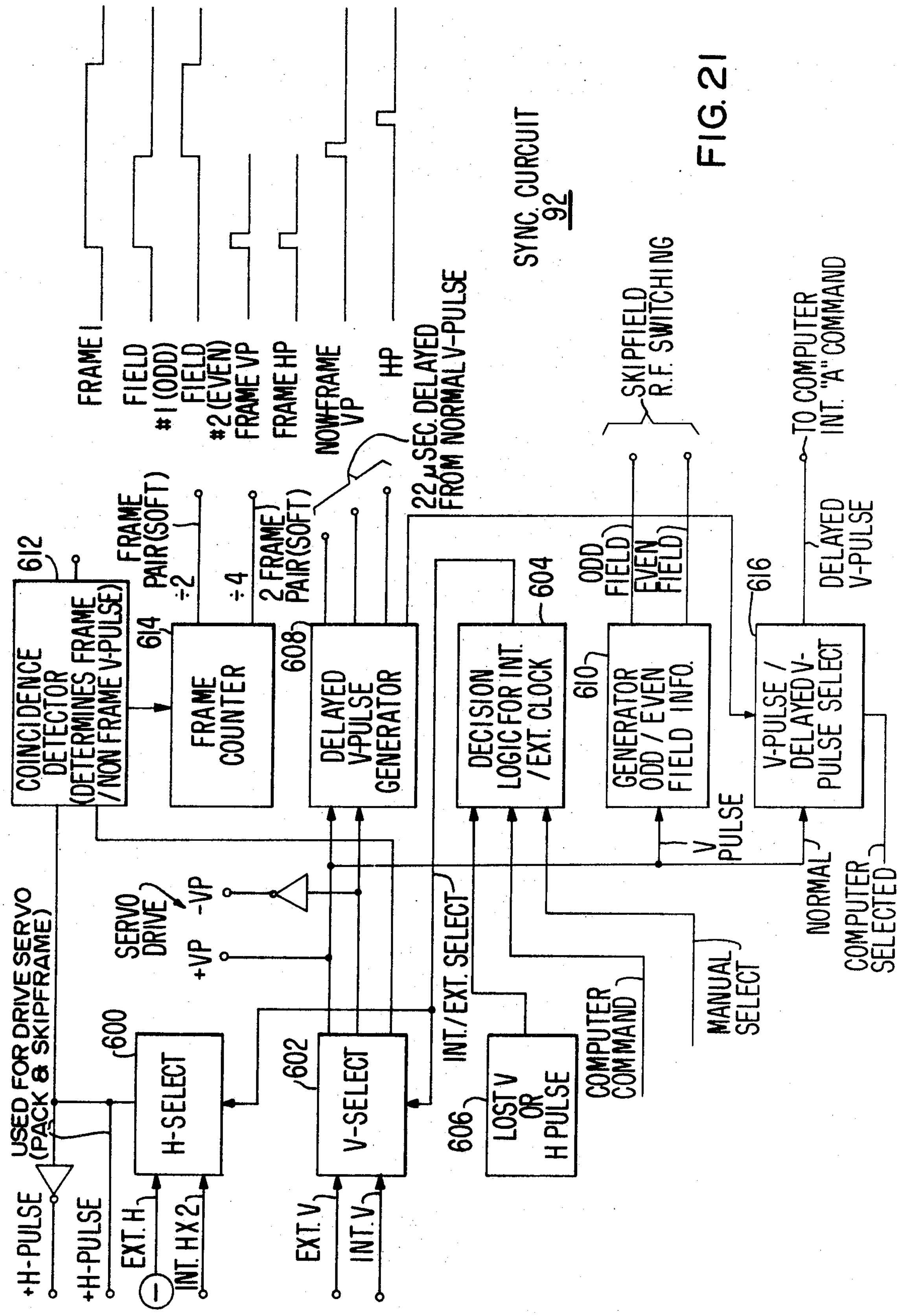
FIG. 21 illustrates in greater detail the synchronizer circuit in FIG. 2A and 2B.

A block diagram of sync circuit 92 is illustrated in FIG. 21. Internal and external H-pulses are inputed into an H-select circuit 600 which selects either the external or internal pulses. The internal H-pulse comes from clock 92 and the external H has some external source. In a similar manner internal and external V-pulses are inputed into a V-select circuit 602.

The decision to use the internal or external V and H pulses is determined by a logic circuit 604 which has three inputs: a manual select input, a computer select input, and a lost V or H pulse select input 606. The latter overrides the other two and is used when one or the other sources of sync is lost.

Once either the internal or external sync pulses are selected, the pulses are used in a number of circuits. In order to understand where these pulses are sent, reference is made additionally to FIG. 22.

For example V-pulses are sent to a delayed V-pulse generator 608. These pulses are delayed 22 microseconds from the normal sync pulses and are sent to the disc drives 50 for selecting heads.

V-pulses are also sent to generator 610 which determines whether the disc pack is in an odd or even field position, where a segment A is defined as odd and segment B as even. These signals are sent to the skip-field play/record circuits 62, 48, and 44.

There are two fields per frame and one V-pulse per field. The computer 66 as well as the servo often needs to know the frame count. By feeding in V and H pulses into a logic circuit called a coincidence detector 612 it is possible to determine whether a particular V-pulse is the beginning of a new frame or whether it is for the second field in the frame.

A frame counter 614 provides frame count information which is utilized by the computer. A pulse select circuit 616 provides either normal or delayed V-pulses to the computer 66. These are used internally by the computer.

VALID H CIRCUIT 650

Figure 23:
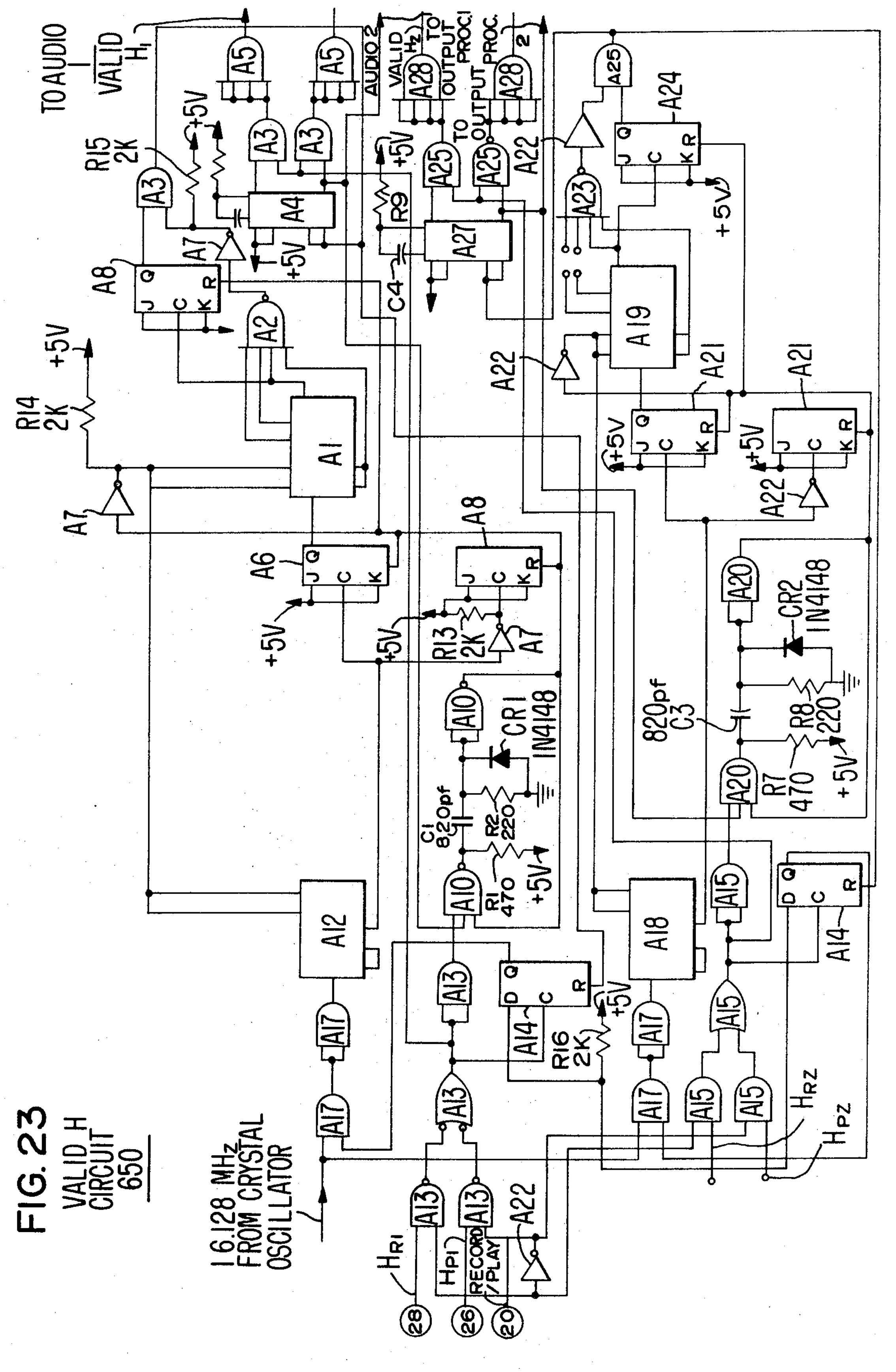
FIG. 23 illustrates a "valid-H" circuit.

A valid H circuit 650, which forms a part of sync circuit 92 is shown schematically in FIG. 23. H-pulses to be validated enter the inputs on the left side of the circuit. There are two inputs, one for the record and one for the play mode. Another input is used in selecting either the play or record H-pulses to be validated. The H-pulses stripped from the input processor 38 are referenced to as HP1 (play mode) and the ones from the output processor 70 are referred to as HR1 (record mode).

If the H-pulse falls within the proper timing "window" to assure that the audio will either be recorded at the proper time in the horizontal internal (record mode), or will be retrieved (playback mode) then an output is given from circuit 650. Two such "Valid H" signals are outputed because there are two system channels, one for channel 1 and one for channel 2. However in the record mode, since only one channel is used to record, only one input channel is used.

The H-pulses must be validated in order to open the audio "windows" because the H-pulses start off a timing sequence for putting the audio information onto the video picture. If you have an invalid H-pulse the sequence doesn't start properly and the audio would appear over into the TV picture and it would disturb the picture. It would be transferred towards the center of the picture rather than out of sight when it is properly within the horizontal interval.

SUMMARY OF THE INVENTION

It is therefore an object of the invention to provide improved apparatus for storing audio-video information signals.

Another object of the invention is to provide apparatus for storing audio-video informations together and in a manner in which the stored information can then be reproduced by randomly addressing the desired audio-video segment.

Another object of the of the invention is to provide an improved automatic video tape editing system in which audio encoded video information can be retrieved by addressing the desired segment of audio encoded video information.

In accordance with the invention apparatus for recording and reproducing audio-video information signals which includes means for encoding audio information signals within, and in synchronization with, the corresponding video information signals to form a composite audio-video information signal. This composite signal is then stored in suitable magnetic storage media, such as a plurality of magnetic disc recorders.

To retrieve and reproduce the stored composite signals, means are provided for randomly addressing desired segments of the composite audio-video signals and then synchronously reproducing the audio and the video portions of the composite signals.

In the preferred embodiment the audio information is encoded and stored within the horizontal sync intervals of the video fields. Also, in the preferred embodiment the addressing means comprises the use of a unique code signal for each recorded video frame or field. Such a code is also stored within the video preferably during the vertical intervals.

We claim:

1. Apparatus for recording and reproducing audio-video information signals comprising:

a. means for encoding audio information signals within video information signals and in synchronization with said corresponding video information signals to thereby form a composite audio-video information signal;

b. recording means for storing said composite audio-video information signal;

c. means for randomly accessing individual segments of said composite audio-video information signals; and d. means for synchronously reproducing said audio and said video information signals, said reproducing means including means for extracting said audio information signals from said segments of said composite audio-video signals.

2. Apparatus as in claim 1 wherein the video information signals are presented as a series of video frames comprising video fields and wherein unique code signals are encoded within each frame of said composite audio-video signals, said accessing means selecting desired segments by addressing the coded frames within said segment.

3. Apparatus as in claim 2 wherein each video frame is characterized by a series of scan lines, a plurality of horizontal sync intervals, and vertical sync associated with said video frames and wherein said audio information signals and said frame code signals are encoded in said sync intervals thereof.

4. Apparatus as in claim 3 wherein said audio information signals are encoded within said plurality of horizontal sync intervals and said frame code signals are encoded within said vertical sync interval.

5. Apparatus as in claim 4 wherein audio information signals corresponding to more than one video field is encoded within said horizontal sync intervals.

6. Apparatus as in claim 3 where audio information signals corresponding to more than one video field is encoded within said sync intervals.

7. Apparatus as in claim 4 wherein audio information signals corresponding to more than one video frame is encoded within said horizontal sync intervals.

8. Apparatus as in claim 3 wherein audio information signals corresponding to more than one video frame is encoded within said sync intervals.

9. Apparatus as in claim 1 wherein said recording means comprises magnetic recording means.

10. Apparatus as in claim 8 where said magnetic recording means comprises a plurality of magnetic discs.

11. Apparatus as in claim 1 wherein said audio information signals comprise audio samples, and including valid H means for sampling and repeating audio samples if the system timing is correct.

* * * * *

UNITED STATES PATENT OFFICE

CERTIFICATE OF CORRECTION

Patent No. 3,740,463 Dated June 19, 1973

Inventor(s) YOUNGSTROM, JERRY R., ET. AL.

It is certified that error appears in the above-identified patent and that said Letters Patent are hereby corrected as shown below:

Column 5, line 62, "so" should read -- to -- . Column 10, line 15, "hardward" should read -- hardware -- . Column 11, line 20, "70" should read -- 79 -- . Column 28, line 37, before "audio", insert -- accessed -- ; line 38, cancel "said" before "video".

Signed and sealed this 25th day of December 1973.

(SEAL)
Attest:

EDWARD M. FLETCHER, JR.
Attesting Officer

RENE D. TEGTMEYER
Acting Commissioner of Patents